(12) United States Patent
Usui et al.

(10) Patent No.: US 9,010,915 B2
(45) Date of Patent: Apr. 21, 2015

(54) AQUEOUS INK COMPOSITION AND IMAGE FORMING APPARATUS

(75) Inventors: Yuuma Usui, Kanagawa (JP); Takeo Tsukamoto, Kanagawa (JP); Aino Hasegawa, Kanagawa (JP); Hideomi Sakuma, Kanagawa (JP); Manabu Seo, Kanagawa (JP); Hiroyuki Yamashita, Kanagawa (JP); Ryota Suzuki, Tokyo (JP); Hisayoshi Ohshima, Kanagawa (JP); Takahiko Matsumoto, Kanagawa (JP); Shigeo Takeuchi, Kanagawa (JP); Takeshi Hihara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 271 days.

(21) Appl. No.: 13/588,748

(22) Filed: Aug. 17, 2012

(65) Prior Publication Data

US 2013/0050363 A1    Feb. 28, 2013

(30) Foreign Application Priority Data

Aug. 22, 2011  (JP) .................................. 2011-180766
May 17, 2012   (JP) .................................. 2012-113608

(51) Int. Cl.
| | |
|---|---|
| *B41J 2/175* | (2006.01) |
| *C09D 11/38* | (2014.01) |
| *B41J 2/21* | (2006.01) |
| *C09D 11/102* | (2014.01) |
| *C08K 5/00* | (2006.01) |
| *C08K 5/098* | (2006.01) |

(52) U.S. Cl.
CPC .............. *C09D 11/38* (2013.01); *B41J 2/2107* (2013.01); *B41J 2/175* (2013.01); *C08K 5/0041* (2013.01); *C08K 5/098* (2013.01); *C09D 11/102* (2013.01)

(58) Field of Classification Search
CPC .............. B41J 2/01; B41J 2/07; B41J 2/2107; B41J 2/17503; B41J 11/0015; B41J 2/175; C09D 11/30; C09D 11/322; C09D 11/38; C09D 11/40; C09D 11/102; C08K 5/0041; C08K 5/098
USPC ........... 347/21, 28, 88, 89, 95–100, 103, 105; 523/160, 161; 106/31.13, 31.27, 31.6
See application file for complete search history.

(56) References Cited

U.S. PATENT DOCUMENTS

| | | |
|---|---|---|
| 4,446,174 A | 5/1984 | Maekawa et al. |
| 4,538,156 A | 8/1985 | Durkee et al. |
| 5,099,256 A | 3/1992 | Anderson |
| 6,039,796 A | 3/2000 | Kubota et al. |

(Continued)

FOREIGN PATENT DOCUMENTS

| | | |
|---|---|---|
| JP | 52-053012 | 4/1977 |
| JP | 55-065269 | 5/1980 |

(Continued)

*Primary Examiner* — Matthew Luu
*Assistant Examiner* — Rut Patel
(74) *Attorney, Agent, or Firm* — Oblon, McClelland, Maier & Neustadt, L.L.P.

(57) ABSTRACT

Disclosed is an aqueous ink composition, including an aqueous solvent, a coloring agent dissolved or dispersed in the aqueous solvent, an ABA-type amphipathic polymer including a hydrophobic segment A and a hydrophilic segment B, and an anionic surfactant configured to dissolve or disperse the ABA-type amphipathic polymer in the aqueous solvent, wherein a viscosity of the aqueous ink composition is changed depending on a pH thereof.

13 Claims, 8 Drawing Sheets

(56) References Cited

U.S. PATENT DOCUMENTS

| | | |
|---|---|---|
| 6,196,674 B1 | 3/2001 | Takemoto |
| 6,261,349 B1 | 7/2001 | Nagai et al. |
| 2001/0038409 A1 | 11/2001 | Yanagawa et al. |
| 2002/0186288 A1 | 12/2002 | Nakazawa et al. |
| 2005/0110856 A1 | 5/2005 | Mouri et al. |
| 2005/0239918 A1 | 10/2005 | Nakazawa et al. |
| 2006/0148997 A1 | 7/2006 | Sato et al. |
| 2007/0015856 A1* | 1/2007 | Sato et al. ............... 524/80 |
| 2008/0006176 A1 | 1/2008 | Houjou |
| 2011/0273523 A1* | 11/2011 | Tsukamoto et al. ......... 347/103 |
| 2012/0050393 A1 | 3/2012 | Usui et al. |
| 2013/0057628 A1* | 3/2013 | Suzuki et al. ............. 347/103 |

FOREIGN PATENT DOCUMENTS

| | | |
|---|---|---|
| JP | 55-144172 | 11/1980 |
| JP | 56-086789 | 7/1981 |
| JP | 56-089594 | 7/1981 |
| JP | 56-089595 | 7/1981 |
| JP | 62-092849 | 4/1987 |
| JP | 64-063185 | 3/1989 |
| JP | 05-096720 | 4/1993 |
| JP | 08-020159 | 1/1996 |
| JP | 08-020161 | 1/1996 |
| JP | 08-142500 | 6/1996 |
| JP | 10-250216 | 9/1998 |
| JP | 11-010856 | 1/1999 |
| JP | 11-188858 | 7/1999 |
| JP | 2000-044855 | 2/2000 |
| JP | 2000-063719 | 2/2000 |
| JP | 2000-343808 | 12/2000 |
| JP | 2002-370441 | 12/2002 |
| JP | 2003-082265 | 3/2003 |
| JP | 2003-089752 | 3/2003 |
| JP | 2003-246135 | 9/2003 |
| JP | 2004-018640 | 1/2004 |
| JP | 2004-026947 | 1/2004 |
| JP | 3595805 | 9/2004 |
| JP | 3658765 | 3/2005 |
| JP | 2005-170036 | 6/2005 |
| JP | 2005-344100 | 12/2005 |
| JP | 2007-023297 | 2/2007 |
| JP | 2008-019286 | 1/2008 |
| JP | 2010-173201 | 8/2010 |
| JP | 2010-188665 | 9/2010 |
| JP | 2010-208147 | 9/2010 |
| JP | 2010-247381 | 11/2010 |
| JP | 2010-253807 | 11/2010 |
| JP | 2011-084041 | 4/2011 |
| JP | 2011-167885 | 9/2011 |
| JP | 2011-235589 | 11/2011 |
| JP | 2012-052027 | 3/2012 |
| WO | WO 2010104136 A1 * | 9/2010 |
| WO | WO 2011142404 A1 * | 11/2011 |

* cited by examiner

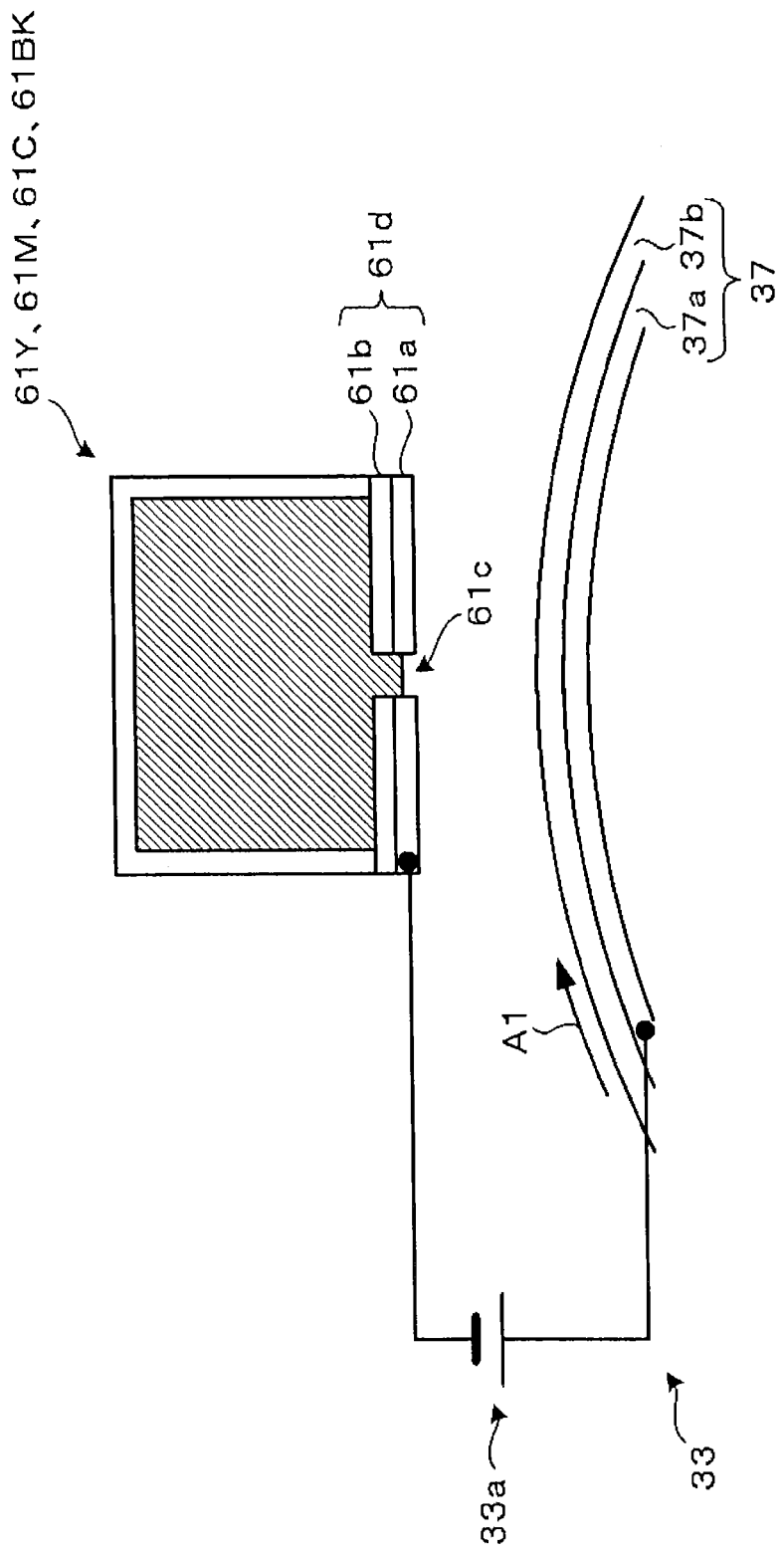

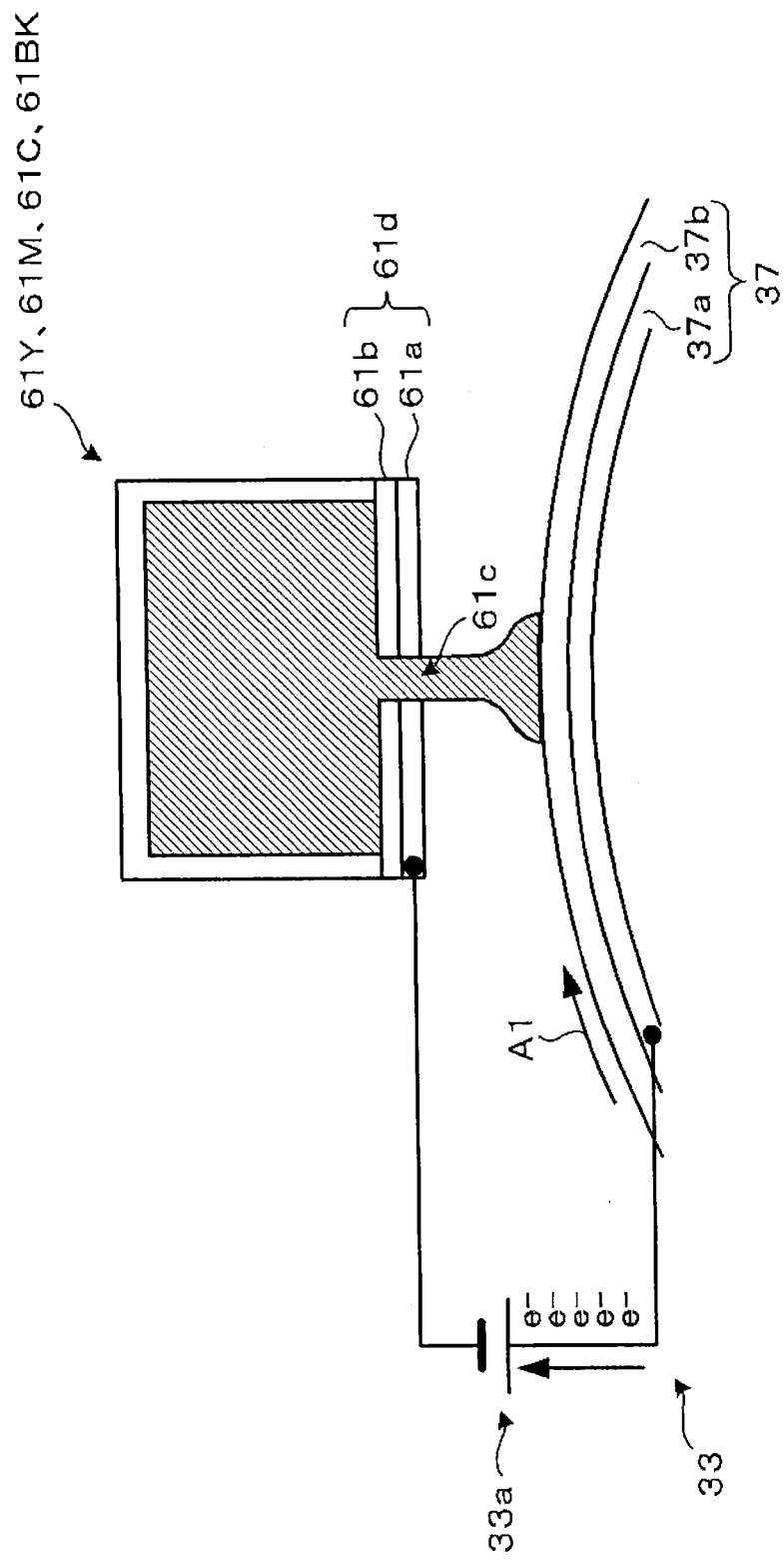

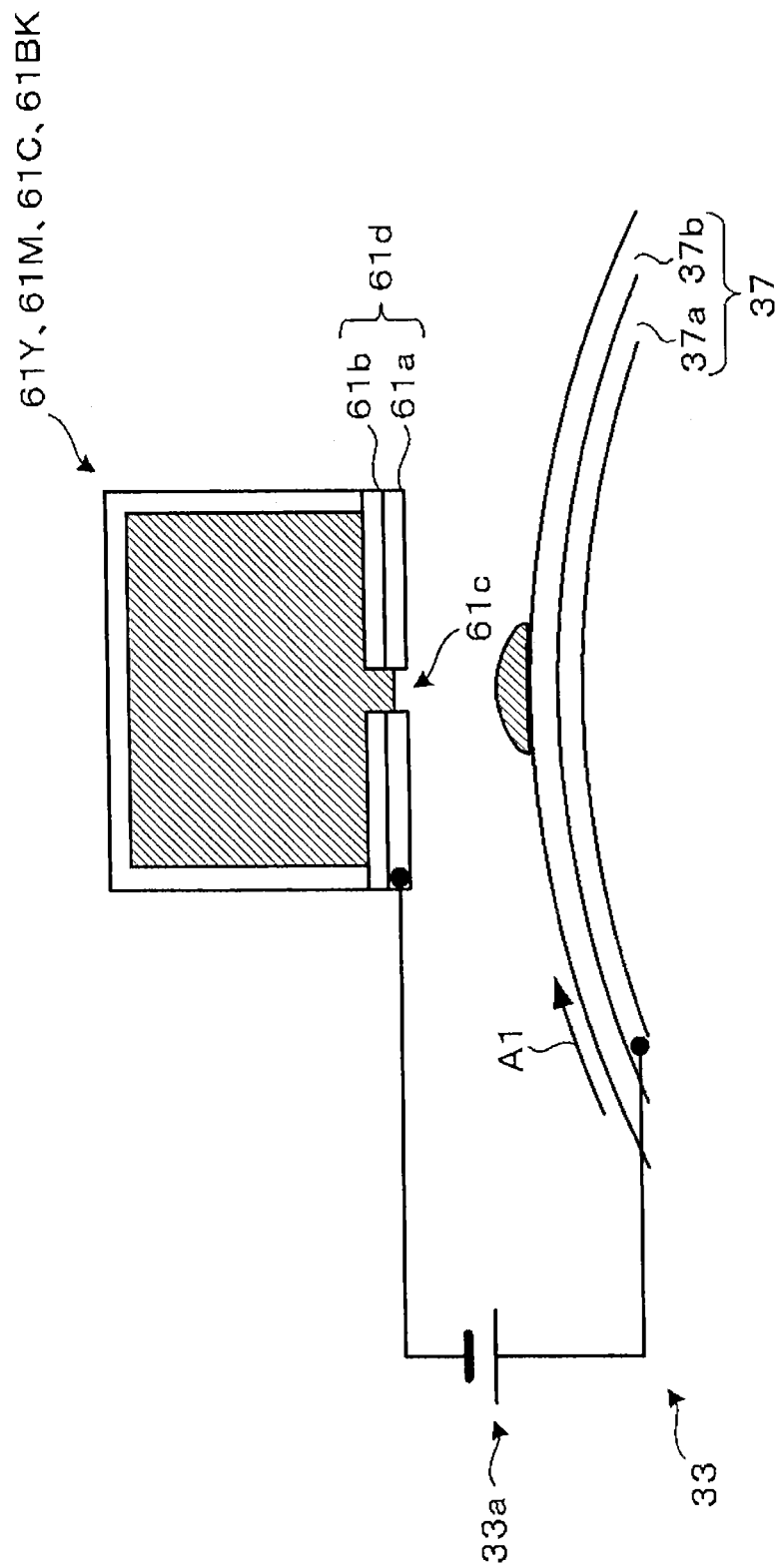

AQUEOUS INK COMPOSITION AND IMAGE FORMING APPARATUS

BACKGROUND OF THE INVENTION

1. Field of the Invention

One aspect of the present invention relates to at least one of an aqueous ink composition and an image forming apparatus.

2. Description of the Related Art

Conventionally, an image forming apparatus such as an ink-jet printer that includes a head for ejecting a recording liquid such as an ink from plural nozzles and conducts ink-jet recording is known (for example, see Japanese Patent Application Publication No. 55-065269, Japanese Patent Application Publication No. 56-086789, Japanese Patent Application Publication No. 55-144172, Japanese Patent Application Publication No. 52-53012, Japanese Patent Application Publication No. 56-089594, Japanese Patent Application Publication No. 56-089595, Japanese Patent Application Publication No. 5-096720, Japanese Patent Application Publication No. 64-063185, Japanese Patent Application Publication No. 8-020159, Japanese Patent Application Publication No. 8-020161, Japanese Patent Application Publication No. 8-142500, Japanese Patent Application Publication No. 10-250216, Japanese Patent Application Publication No. 11-10856, Japanese Patent Application Publication No. 2000-044855, Japanese Patent Application Publication No. 2000-063719, U.S. Pat. No. 4,538,156, U.S. Pat. No. 5,099,256, Japanese Patent Application Publication No. 62-092849, Japanese Patent Application Publication No. 11-188858, Japanese Patent Application Publication No. 2000-343808, Japanese Patent No. 3658765, Japanese Patent Application Publication No. 2003-246135, Japanese Patent Application Publication No. 2002-370441, Japanese Patent Application Publication No. 2005-170036, Japanese Patent Application Publication No. 2003-82265, Japanese Patent Application Publication No. 2008-019286, Japanese Patent Application Publication No. 2010-188665, Japanese Patent Application Publication No. 2007-023297, Japanese Patent Application Publication No. 2005-344100, Japanese Patent Application Publication No. 2004-018640, Japanese Patent No. 3595805, Japanese Patent Application Publication No. 2003-089752, and Japanese Patent Application Publication No. 2004-026947).

In ink-jet recording, ink is ejected from a miniature nozzle of several dozen and hence, a dye with a high solubility has been used as a coloring agent for an ink in view of a problem of ink clogging, etc. A dye ink is excellent in its coloring property, and as a result, it is possible to obtain an image quality in a photographic print which is comparable to that of a silver halide photograph, but has a problem of degradation in an image preserving property such as a water-resistant property, a light-resistant property, or a gas-resistant property. In order to compensate for such a problem, utilization of a pigment as a coloring agent for an ink has been advancing and its installation is also made for a printer in a personal market or office market as well as an industrial wide-format printer.

For printing a color image or character on a plain paper sheet, permeability of an ink into a paper sheet has been improved by adding a surfactant, etc., to an ink to suppress its bleeding (spreading) at a color border of an overlap portion of two colors, etc. (for adding a surfactant, etc., into an ink, see, for example, Japanese Patent Application Publication No. 55-065269). Although it may be possible to reduce bleeding at a color border by improving permeability of an ink into a paper sheet, its permeation occurs along a cellulose fiber forming a plain paper sheet and hence bleeding (feathering) may readily occur at a peripheral portion of a printed image such as a character or fine line.

An idea of using an ink with a low permeability only for printing a black character, etc., has been applied to attain prevention of both bleeding and feathering, but in that case, there may remain a problem that dryness of a black ink may be low and high-speed character printing may be difficult.

Then, an ink-jet-dedicated recording medium that is preliminarily coated with a material (a water-soluble polymer, a white pigment, etc.) for fixing a coloring agent in an ink has been proposed (for example, see Japanese Patent Application Publication No. 56-086789, Japanese Patent Application Publication No. 55-144172, Japanese Patent Application Publication No. 52-53012, and Japanese Patent Application Publication No. 56-089594). Such a dedicated paper sheet suitable for ink-jet recording is used so that an image quality may be improved significantly. However, there may be a problem in the cost of a dedicated paper sheet, and hence, printing of a character on a plain paper sheet at a high image quality is desired, in particular, in a business application.

For application to a general recording medium such as a plain paper sheet, an ink-jet recording method has been proposed wherein a solution of a polymer such as carboxymethyl cellulose, polyvinyl alcohol, or polyvinyl acetate is preliminarily jetted onto a recording medium and then character printing is conducted by ejecting an ink onto a portion to which such a polymer solution adheres (for example, see Japanese Patent Application Publication No. 56-089595). However, such a polymer solution may not suppress feathering and a water-resistant property may also not be improved.

Furthermore, an apparatus for forming an image by using an ink-jet recording head has been proposed wherein such an image forming apparatus has means for applying a water-absorptive resin particle(s) for absorbing an ink on a recording medium, means for ejecting an ink onto the water-absorptive resin particle(s) applied on the recording medium, and means for fixing the water-absorptive resin particle(s) on the recording medium (for example, see Japanese Patent Application Publication No. 5-096720). However, a water-absorptive resin particle(s) may readily absorb moisture or be aggregated due to water absorption in an apparatus or at the time of storage whereby some deficiencies may readily occur, for example, it may be difficult to apply a water-absorptive resin particle(s) on a recording medium uniformly.

Furthermore, an ink-jet recording method has been proposed wherein a pretreatment fluid for recording medium which includes a compound for insolubilizing a coloring agent in an ink is adhered to a recording medium by an ink-jet method and subsequently an ink is ejected onto a portion to which such a pretreatment fluid for recording medium adheres, so that an image is formed (for example, see Japanese Patent Application Publication No. 64-063185, Japanese Patent Application Publication No. 8-020159, and Japanese Patent Application Publication No. 8-020161). In such a method, improvement at some level on both bleeding and feathering may be attained. However, in such a method, it may be necessary to reduce a viscosity of a pretreatment fluid in order to eject the pretreatment fluid stably, and hence, a compound for insolubilizing a coloring agent may necessarily be provided at a low concentration. It may be necessary to provide a comparatively large amount of a pretreatment fluid in order to obtain a sufficient effect of improving an image quality by means of such a pretreatment fluid and a large amount of a liquid including water is provided on a recording medium, whereby curling or cockling of a recording medium may readily occur.

Furthermore, an image forming method has been proposed wherein a colorless liquid composition that contains at least a silicone compound such as a silicone oil and a cationic compound is applied on a recording medium and subsequently an ink that contains an anionic component is adhered to the recording medium by an ink-jet recording mode (for example, see Japanese Patent Application Publication No. 8-142500). However, there may be a problem that a permeability of an ink into a recording medium portion to which a silicone compound adheres may be significantly low and hence drying of an image portion may be slow.

Furthermore, in order to improve a permeability or wettability of an ink, a method for forming an image has been proposed wherein an image recording promotion fluid that contains a compound for insolubilizing a coloring agent and a predetermined surfactant is provided on a recording medium and subsequently an ink is adhered to the recording medium by an ink-jet recording mode (for example, see Japanese Patent Application Publication No. 10-250216). According to such a method, a surfactant in an image recording promotion fluid may improve a permeability or wettability of an ink for a recording medium so that drying of an image may be improved to allow application of high-speed recording, but a quantity of a component for insolubilizing a coloring material may be small so that an effect of preventing bleeding or feathering may be insufficient, whereby a further improvement is desired.

Furthermore, a technique has been proposed in which a reaction fluid that contains a multivalent metal salt for insolubilizing a coloring agent in an ink is applied on a recording medium (for a reaction fluid containing a multivalent metal salt, for example, see Japanese Patent Application Publication No. 11-10856, Japanese Patent Application Publication No. 2000-044855, and Japanese Patent Application Publication No. 2000-063719). An image quality may significantly be improved by such a technique.

Meanwhile, a method called an intermediate transfer mode has been proposed wherein an ink image is formed on an ink-impermeable intermediate transfer body by an ink-jet recording method and subsequently the ink image is transferred from the intermediate transfer body to a recording medium (for example, see U.S. Pat. No. 4,538,156 and U.S. Pat. No. 5,099,256). In an intermediate transfer mode, it may be possible to arrange a recording head away from a recording paper sheet and it may be possible to suppress clogging caused by adhesion of paper powder on a nozzle of a recording head. Furthermore, although it may be generally difficult to keep always a gap between a recording head and a recording paper sheet constant, it may be possible to keep a gap between a recording head and an intermediate transfer body constant and provide a good compatibility with a kind of paper, so that a mode using an intermediate transfer body may have a high reliability. However, when an intermediate transfer body is made of a material with a good release characteristic in order to obtain a high transfer rate, there may be a problem that an aggregate of adjacent fluid drops, called a bleeding or beading, may readily and severely be produced and an image quality may readily be degraded.

For improving such an intermediate transfer mode, a method has been proposed in which an ink is ejected onto an intermediate transfer body to form an ink image and subsequently most of water in the ink is vaporized on the intermediate transfer body to transfer a concentrated ink onto a recording medium such as a paper sheet (for example, see Japanese Patent Application Publication No. 62-092849). In such a method, once a good image is formed on an intermediate transfer body, it may be possible to obtain an image with a good quality, even on a so-called plain paper sheet that is commonly used. However, time may be consumed for concentrating an ink at an ordinary temperature, and hence, it may be necessary to heat an intermediate transfer body so as to promote vaporization of a solvent in an ink, and as a result, there may be a problem that a large amount of energy may be needed.

Furthermore, a method has been proposed in which a particle of a water-absorptive resin such as polyacrylic acid is provided on a surface of an intermediate transfer body to absorb water in an ink provided on the intermediate transfer body and subsequently transfer onto a recording medium is conducted together with the particle of a water-absorptive resin (for example, see Japanese Patent Application Publication No. 11-188858 and Japanese Patent Application Publication No. 2000-343808). Although it may be possible for such a method to obtain an image with a good quality even on a plain paper sheet, there may be a problem that an aggregate of water-absorptive resin particles may be provided by means of moisture absorption at time of storage and it may be difficult to conduct uniform application on an intermediate transfer body, etc., similarly to a technique using means for applying water-absorptive resin particles for absorbing the above-mentioned ink on a recording medium, etc.

Furthermore, a method has been proposed in which a reaction fluid that contains a multivalent metal salt or polyallylamine reacting with a component of an ink is adhered to an intermediate transfer body and provided onto a recording medium before or after an ink is ejected onto the recording medium to form an image (for example, see Japanese Patent No. 3658765). It may be possible for such a method to reduce a reaction fluid adhered to a recording medium compared to a conventional method and reduce curling or cockling caused on a recording medium.

Furthermore, an image forming method has been proposed wherein a treatment fluid that contains a cationic polymer compound and a surfactant and/or a wetting promoting agent is provided onto an intermediate transfer body to contact and mix the treatment fluid with an ink ejected by an ink-jet mode and subsequently transfer to a recording medium is conducted (for example, see Japanese Patent Application Publication No. 2003-246135).

Similarly, an image forming method has been proposed wherein a treatment fluid that contains a multivalent metal salt which reacts with an anionic ink coloring agent to cause aggregation, etc., is provided onto an intermediate transfer body to contact and mix the treatment fluid with an ink ejected by an ink-jet mode and subsequently transfer to a recording medium is conducted (for example, see Japanese Patent Application Publication No. 2002-370441, Japanese Patent Application Publication No. 2005-170036, and Japanese Patent Application Publication No. 2003-82265). More specifically, it has been proposed that a water-soluble resin with a minimum filming temperature (MFT) less than or equal to 30 degrees is further contained in an ink or a treatment fluid whereby it may be possible to further provide a rub resistance to an image (for example, see Japanese Patent Application Publication No. 2002-370441). It has also been proposed that it may be possible to provide a water-soluble resin onto an image before transfer to provide a rub resistance similarly (for example, see Japanese Patent Application Publication No. 2005-170036). It has been proposed that a resin emulsion having an ionic group on a resin particle surface, as one more reaction component other than a coloring agent that reacts with a treatment fluid, is further contained in an ink to enhance an aggregating power of a coloring agent due to an additional effect of causing aggregation (for example, see Japanese Patent Application Publication No. 2003-82265).

It has also been proposed that when contact and mixing with an ink is conducted, a treatment fluid for significantly changing a pH of a mixed fluid is provided onto an intermediate transfer body (for example, see Japanese Patent Application Publication No. 2008-019286).

Such a reaction fluid or treatment fluid may be effective to solve a problem (bleeding, feathering, or beading) associated with a quality of an image on an intermediate transfer body or a recording medium. However, when a reaction fluid or treatment fluid is applied an entire surface of a paper sheet or intermediate transfer body, there may be a problem of inefficiency because of an unused non-image portion. Furthermore, a consumable supply other than an ink may increase, and hence, there may be a problem that a running cost may increase. Furthermore, a reaction fluid or treatment fluid is based on water, so that an amount of water absorbed in a paper sheet may increase ultimately and curling or cockling may readily occur. When a printing rate increases, such curling or cockling tends to be significant, which may be problematic. Hence, where possible, it may be desirable not to use such a reaction fluid or treatment fluid.

Besides spreading or color mixing on a recording medium such as feathering or bleeding, there may be a problem in a fixation property (rub resistance) in a case of a pigment-type ink coloring agent. As a method for improving a fixation property, it has been proposed that a resin emulsion is contained in an ink (for example, see Japanese Patent Application Publication No. 2004-026947). Furthermore, a resin may be needed for improving a fixation property of a pigment particle on a surface of a recording medium, as it has been proposed that a comparatively low-molecular water-soluble resin instead of a resin emulsion is contained in an ink.

As described above, various propositions have been provided in order to conduct recording on a plain paper sheet with a high image quality, a high speed, and a high reliability.

In a circumstance as described above, it is desired that an ink composition capable of obtaining an image with a high image quality and less feathering, bleeding, or paper sheet curling on a plain paper sheet and an image forming apparatus using the same are proposed. Furthermore, it is desired that an ink composition capable of obtaining an image with a high image quality, a good fixation property, and a high image density on a variety of recording media using a consumable supply other than an ink such as a reaction fluid or treatment fluid as little as possible and an image forming apparatus using the same are proposed. Furthermore, it is desired that an energy-saving ink composition which may not need a large amount of thermal energy to vaporize water in an ink on an intermediate transfer body and an image forming apparatus using the same are proposed.

SUMMARY OF THE INVENTION

According to one aspect of the present invention, there is provided an aqueous ink composition, comprising an aqueous solvent, a coloring agent dissolved or dispersed in the aqueous solvent, an ABA-type amphipathic polymer including a hydrophobic segment A and a hydrophilic segment B, and an anionic surfactant configured to dissolve or disperse the ABA-type amphipathic polymer in the aqueous solvent, wherein a viscosity of the aqueous ink composition is changed depending on a pH thereof.

According to another aspect of the present invention, there is provided an image forming apparatus, including an image forming device configured to provide the aqueous ink composition as described above onto a recording medium depending on an image signal to form an image.

BRIEF DESCRIPTION OF THE DRAWINGS

FIGS. 2A, 2B, and 2C are schematic diagrams for illustrating an aspect of providing a recording liquid from a head to an intermediate transfer body in the image forming apparatus illustrated in FIG. 1.

DETAILED DESCRIPTION OF THE PREFERRED EMBODIMENTS

Figure 1:
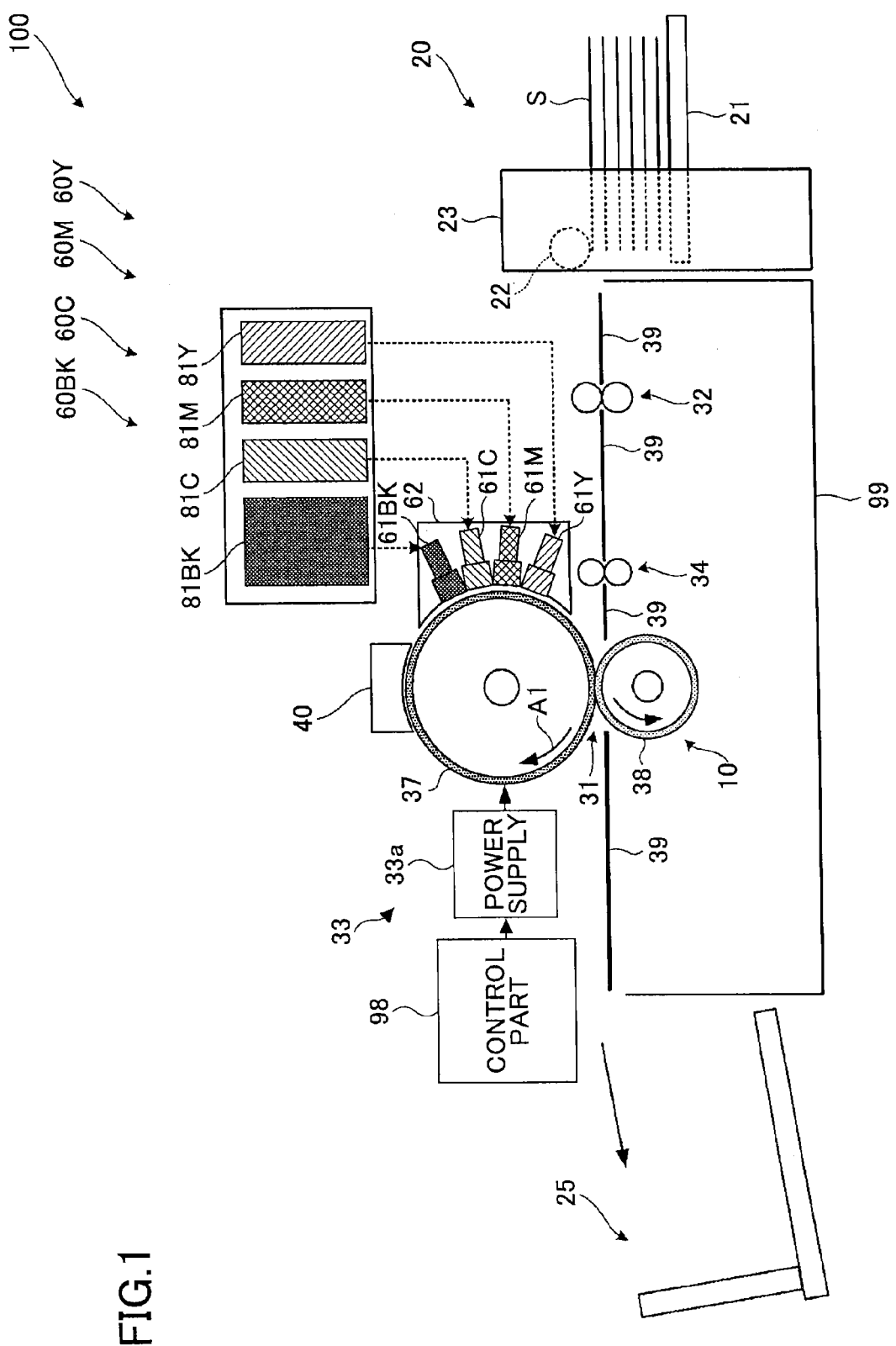
FIG. 1 is a schematic front view of one practical example of an image forming apparatus to which an embodiment of the present invention has been applied.

FIG. 1 schematically illustrates an image forming apparatus to which an embodiment of the present invention is applied. An image forming apparatus 100 is a printer such as an ink-jet printer and is capable of conducting formation of a full color image. The image forming apparatus 100 conducts an image formation process based on an image signal corresponding to image information received from an exterior thereof. The image forming apparatus 100 is capable of conducting image formation on a sheet-type recording medium that may be any of an OHP sheet, a cardboard such as a card or a postcard, and an envelope, etc., as well as a plain paper sheet to be generally used for copying, etc. The image forming apparatus 100 is a one-side image forming apparatus capable of forming an image on one side of a transfer paper sheet S which is a body to be recorded on as a paper sheet for recording which is a recording medium, but may be a double-side image forming apparatus capable of forming an image on both sides of a transfer paper sheet S.

The image forming apparatus 100 has heads 61Y, 61M, 61C, and 61BK as recording heads which are ink heads as recording liquid ejectors for ejecting recording liquids as color inks and are capable of forming images as images which respectively correspond to colors which are provided by color separation into respective colors of yellow, magenta, cyan, and black.

The heads 61Y, 61M, 61C, and 61BK are arranged and located at positions opposing a peripheral surface of an intermediate transfer body 37 as an intermediate transfer roller which is an intermediate transfer drum arranged and located at a generally central portion of a body 99 of the image forming apparatus 100. The heads 61Y, 61M, 61C, and 61BK are aligned in this order at an upstream side in a direction A1 which is a direction of movement of the intermediate transfer body 37 and a clockwise direction in FIG. 1. Y, M, C, and BK placed behind a numeral of each symbol in the same figure indicate members for yellow, magenta, cyan, and black, respectively.

The heads 61Y, 61M, 61C, and 61BK are included in ink ejection devices 60Y, 60M, 60C, and 60BK which are recording liquid ejection devices as image forming means for forming yellow (Y), magenta (M), cyan (Y), and black (BK) images, respectively. Additionally, the heads 61Y, 61M, 61C, and 61BK are line heads included in the ink ejection devices 60Y, 60M, 60C, and 60BK, respectively, in such a manner that the plural ones are aligned and located in a direction perpendicular to the plane of paper in FIG. 1.

While the intermediate transfer body 37 rotates in the direction A1, yellow, magenta, cyan, and black recording liquids are ejected from the heads 61Y, 61M, 61C, and 61BK, respectively, and provided onto its areas opposing the heads 61Y, 61M, 61C, and 61BK, respectively, so as to be superposed sequentially, whereby an image which is a primary image is formed on a primary image forming surface which is its surface. Thus, the image forming apparatus 100 has a tandem configuration in which the heads 61Y, 61M, 61C, and 61BK oppose the intermediate transfer body 37 and aligned and located in the direction A1.

Ejections or applications of recording liquids from the heads 61Y, 61M, 61C, and 61BK onto the intermediate transfer body 37 are conducted at different times from an upstream side to a downstream side in the direction A1 so that each of yellow, magenta, cyan, and black color image areas is superposed on the same position on the intermediate transfer body 37.

As illustrated in FIG. 1, the image forming apparatus 100 includes the ink ejection devices 60Y, ROM, 60C, and 60BK which include the head 61Y, 61M, 61C, and 61BK, respectively, a conveyance unit 10 as a paper sheet conveyance unit which includes the intermediate transfer body 37 and conveys a transfer paper sheet S due to rotation of the intermediate transfer body 37 in the direction A1, a paper feeding unit 20 which is capable of stacking multiple transfer paper sheets S and feeds and sends only a top transfer paper sheet S among such stacked transfer paper sheets S to the conveyance unit 10, and a paper ejection tray 25 capable of stacking image-formed or printed multiple transfer paper sheets S conveyed by the conveyance unit 10.

The image forming apparatus 100 also includes a cleaning device 40 that is a cleaning unit as cleaning means which are arranged and located so as to oppose the intermediate transfer body 37 above the intermediate transfer body 37 and conduct cleaning by removing a recording liquid remaining on the intermediate transfer body 37 or a primary image forming surface from the intermediate transfer body 37 after the recording liquid transfers to a transfer paper sheet S, and a carriage 62 as a head supporter for integrally supporting the heads 61Y, 61M, 61C, and 61BK.

The image forming apparatus 100 also includes electrical conduction means 33 for conducting an electrical current including an electrical current component caused by an electrode oxidation reaction or an electrode reduction reaction inside a recording liquid in a liquid column state in such a manner that an electrical potential difference is provided between the intermediate transfer body 37 and the head 61Y, 61M, 61C, or 61K while a liquid column originating from a recording liquid immediately after being ejected from the head 61Y, 61M, 61C, or 61BK temporarily provides a bridge between the head 61Y, 61M, 61C, or 61BK and the intermediate transfer body 37 as illustrated in FIG. 2B, and a control part 98 as control means which control a general function of the image forming apparatus 100 and includes a CPU, a memory, etc. as being not illustrated in the figures.

The ink ejection devices 60Y, 60M, 60C, and 60BK, the conveyance unit 10, the cleaning device 40, the carriage 62, the electrical conduction means 33, a control board for the head 61Y, 61M, 61C, and 61BK included in the control part 98 and being not illustrated in the figures constitute an image or character printing unit.

The conveyance unit 10 includes, besides the intermediate transfer body 37, a transfer roller 38 which is a pressurizing roller as transfer means which are transfer recording means which are arranged to oppose the intermediate transfer body 37, are driven by the intermediate transfer body 37 to rotate, and transfer a primary image originating from a recording liquid carried on the intermediate transfer body 37 onto a transfer paper sheet S when the transfer paper sheet S passes though a transfer part 31 between them and the intermediate transfer body 37, thereby conducting transfer recording.

The conveyance unit 10 also includes a conveyance roller 32 for conveying a transfer paper sheet S fed and sent from the paper feeding unit 20 toward the transfer part 31, and a resistance roller 34 for temporarily stopping a transfer paper sheet S conveyed by the conveyance roller 32 and feeding and sending such a stopped transfer paper sheet S to the transfer part 31 depending on the timing at which an image formed on the intermediate transfer part 37 arrives at the transfer part 31 due to rotation of the intermediate transfer body 37 in the direction A1.

The conveyance unit 10 also includes a guide plate 39 for guiding a transfer paper sheet S fed and sent from the paper feeding unit 20 to the transfer part 31 and guiding such a transfer paper sheet S having passed through the transfer part 31 to the paper ejection tray 25 and a motor, etc., as driving means that drive the intermediate transfer body 37 so as to rotate in the direction A1 and are not illustrated in the figures. Thus, the image forming apparatus 100 is an indirect mode image forming apparatus for indirectly conducing image formation onto a transfer paper sheet S by using the intermediate transfer body 37.

As illustrated in FIGS. 2A, 2B, and 2C, the intermediate transfer body 37 is composed of a supporter 37a made of an aluminum and a surface layer 37b made of an electrically conductive silicone rubber formed on the supporter 37a. A material of the supporter 37a is not limited to aluminum, but is formed of a metal or an alloy, because it may be necessary to have a good electrical conductivity and mechanical strength. The surface layer 37b is not limited to one made of an electrically conductive silicone rubber, and may be formed of a smooth elastic material with a high electrical conductivity and water-repellency. An electrical conductivity of the surface layer 37b may be a function needed to apply an electric voltage between the intermediate transfer body 37 and the head 61Y, 61M, 61C, or 61BK so as to cause electrolysis of water in a bridge of recording liquid formed therebetween. A water-repellency of the surface layer 37b may be an index of a facilitation of transfer when a recording liquid transfers from the surface layer 37b of the intermediate transfer body 37 to a transfer paper sheet S, and when the water-repellency is high, a rate of transfer may be good. However, when the water-repellency is high, there may be a trade-off relationship such that a recording liquid with an insufficient viscosity may be difficult to be fixed at a position of a drop landing onto the surface layer 37b and cause beading. An elasticity of the surface layer 37b may be a function needed for transfer and the surface layer 37b is deformed by a fiber of a transfer paper sheet S, whereby a contact surface area may be improved and a high rate of transfer may be attained. For conducting transfer at a low pressure, it may be necessary to select a moderately soft material for a material of the surface layer 37b.

For a material satisfying such a function of the surface layer 37b, there may be provided, for example, an electrically conductive rubber provided by mixing a carbon black, a carbon nanotube, or a fine particle of a metal such as gold or silver into a rubber material such as a fluorosilicone rubber, a phenylsilicone rubber, a fluororubber, a chloroprene rubber, a nitrile rubber, a nitrile-butadiene rubber, an isoprene rubber, etc. Although it is considered that an electrically conductive fine particle may be increased in order to increase an electrical conductivity, degradation of a water-repellency may be caused when a density of an electrically conductive fine particle on a surface is high. Although it may be necessary to have an electrical conductivity in a direction of a film thickness of the supporter 37a and surface layer 37b, an anisotropic electrical conductivity may be provided so as to be insulated in a direction of its surface. Although it may be necessary for a size of an electrically conductive fine particle to be sufficiently less than about 20-50 μm of a dot constituting an image, less than 0.1 μm may not be problematic. Furthermore, the surface layer 37b may be impregnated with a silicone oil for increasing a water-repellency and may have either a single layer structure or a multi-layer structure.

A preferable bulk physical property and surface physical property of the surface layer 37b are as follows. For a water-repellency, a receding contact angle of water is 60° or greater and preferably 80° or greater, and a hardness on JIS-A is 60 or less and preferably 40 or less. Furthermore, a thickness of a surface layer is preferably about 0.1-1 mm, and suitably 0.2-0.6 mm. An electric resistivity is 1000 Ω·cm or less and preferably 10 Ω·cm or less.

As illustrated in FIG. 1, the paper feeding unit 20 includes a paper feeding tray 21 capable of stacking multiple transfer paper sheets S, a paper feeding roller 22 as a delivery roller for feeding and sending only a top transfer paper sheet S among transfer paper sheets S stacked on the paper feeding tray 21 to the conveyance unit 10, a housing 23 for supporting the paper feeding tray 21 and the paper feeding roller 22, and a motor, etc., as driving means which drive the paper feeding roller 22 to rotate so as to feed and send a transfer paper sheet S in accordance with timing of ejection of recording liquids from the heads 61Y, 61M, 61C, and 61BK and are not illustrated in the figures.

The cleaning device 40 includes a cleaning blade as an insulating cleaning member which contacts the intermediate transfer body 37 to clean a recording liquid on the intermediate transfer body 37 and is not illustrated in the figures. Such a cleaning blade contacts its portion or tip with the intermediate transfer body 37 to have a function of scraping a recording liquid on a surface of the intermediate transfer body 37, specifically, a recording liquid remaining after transfer, and has an abrasion resistance.

The carriage 62 is attachable and detachable to the body 99 integrally with the heads 61Y, 61M, 61C, and 61BK to be replaceable with new heads 61Y, 61M, 61C, and 61BK when degradation, etc., occurs thereon, or to facilitate maintenance thereof. Each of the heads 61Y, 61M, 61C, and 61BK is also attachable and detachable to the body 99 independently to be replaceable with new one when degradation, etc., occurs thereon or to facilitate maintenance thereof. Thereby, a replacement operation or a maintenance operation may be facilitated.

For the ink ejection devices 60Y, 60M, 60C, and 60BK, colors of recording liquids to be used are different, but, for anything else, generally similar configurations are provided for one another. For each of the ink ejection devices 60Y, 60M, 60C, and 60BK, a plurality of the heads 61Y, 61M, 61C, or 61BK are aligned and located in a main scanning direction, and the ink ejection devices 60Y, 60M, 60C, and 60BK and the image forming apparatus 100 are full-line-type ones.

The ink ejection devices 60Y, 60M, 60C, and 60BK include ink cartridges 81Y, 81M, 81C, and 81BK which are recording liquid cartridges as main tanks for containing recording liquids with corresponding colors to be supplied to the plural heads 61Y, 61M, 61C, and 61BK, a pump as a supply pump which pumps, supplies and sends recording liquids contained in the ink cartridges 81Y, 81M, 81C, and 81BK to the heads 61Y, 61M, 61C, and 61BK, respectively, and is not illustrated in the figures, and distributor tanks which are distributors as ink supplying parts that are recording liquid supplying parts for distributing and supplying recording liquids supplied from sides of the ink cartridges 81Y, 81M, 81C, and 81BK by the pump to the heads 61Y, 61M, 61C, and 61BK, respectively, and which are not illustrated in the figures.

The ink ejection devices 60Y, 60M, 60C, and 60BK also include an ink amount detection sensor as ink amount detection means which are recording liquid amount detection means for detecting amounts of recording liquids in order to detect deficiencies in amounts of the recording liquids in the distributor tanks and are not illustrated in the figures, pipes which form supplying and sending paths for the recording liquids between the ink cartridges 81Y, 81M, 81C, and 81BK and the distributor tanks together with the pump and are not illustrated in the figures, and pipes which form supplying and sending paths for the recording liquids between the distributor tanks and the heads 61Y, 61M, 61C, and 61BK, respectively, and are not illustrated in the figures.

The ink cartridges 81Y, 81M, 81C, and 81Bk are attachable and detachable to the body 99 to be replaceable with new ones when internal recording liquids are consumed so that there is a less amount of or no remainder, or to facilitate maintenance thereof.

An operation of the pump is controlled by the control part 98. Specifically, when ejection of a recording liquid by the head 61Y, 61M, 61C, or 61Bk is stopped on the condition that a deficiency in an amount of recording liquid in the distributor tank is detected by the ink amount detection sensor, driving is conducted until such a deficiency is not detected, and a recording liquid in the ink cartridge 81Y, 81M, 81C, or 81BK is supplied to the distributor tank. Herein, the control part 98 functions as an ink supply control means which are recording liquid supply control means. In addition, the control part 98 controls driving of a component to be driven in the image forming apparatus 100, even if no particular explanation is provided.

A recording liquid may include, at least, a color material which is a coloring agent corresponding to yellow, magenta, cyan, or black, a solvent for such a color material, an ABA-type amphipathic polymer composed of a hydrophobic segment A and a hydrophilic segment B, and an anionic surfactant for dissolving or dispersing such an ABA-type amphipathic polymer in an aqueous solvent as described above. A solvent may be an aqueous solvent including water from the viewpoint of safety and the viewpoint of electrical conductivity for causing electrolysis described below, and a recording liquid may be an aqueous ink composition. An ionic property of a color material dissolved or dispersed in a solvent and charged in a solvent is an anionic, and an anionic coloring agent and/or an anionic resin may be used.

For a hydrophobic segment A or hydrophobic block A of an ABA-type amphipathic polymer, any of the followings may be applicable. For example, there may be provided dodecyl, tridecyl, tetradecyl, pentadecyl, hexadecyl, heptadecyl, octadecyl, nonadecyl, eicosyl, etc., which is a linear alkyl group with a carbon number of 12 or more. Furthermore, for a branched alkyl group, there may be provided a combination thereof, such as 2-decyldocecyl, 2-dodecyldodecyl, or 2-decylhexadecyl. Furthermore, there may be provided, for an aromatic alkyl group, phenylalkyl, diphenylalkyl, triphenylalkyl, naphthylalkyl, dinaphthylalkyl, or trinaphthylalkyl, anthracenylalkyl, dialkylphenylalkyl or trialkylphenylalkyl which is a branched alkyl group with a benzene ring as a branch point and contains a phenyl group, or for a cyclic alkyl group containing one, cyclohexylalkyl, dialkylcyclohexylalkyl, trialkylcyclohexylalkyl, cyclopentylalkyl, dialkylcyclopentylalkyl, trialkylcyclopentylalkyl, etc. Thus, it may be desirable for a hydrophobic block A to contain, at least, any one of a linear alkyl group, a branched alkyl group, a cyclic alkyl group, and a phenyl group.

Furthermore, there may be provided a block polymer from a hydrophobic monomer. For example, there may be provided a styrene polymer, an alkyl acrylate polymer, an alkyl methacrylate polymer, an alkyl acrylamide polymer, an alkyl methacrylamide polymer, etc.

For a hydrophilic segment B or hydrophilic block B of an ABA-type amphipathic polymer, any one having an affinity with an aqueous solvent may be applicable. In order to increase a viscosity of an ink composition by means of a physical bridge caused by hydrophobic association in an aqueous solvent, it may be necessary for a hydrophilic block B to have a sufficiently longer (or larger) chain than a hydrophobic block A, and as such, there may be provided of 100 or more monomers such as an ethylene oxide polymer or propylene oxide polymer which contains a linear polyethylene oxide. A hydrophilic block may have a 4-Arm structure or 6-Arm structure which contains a multi-branched polyethylene oxide with a branched hydrophilic portion. "Arm" means a hydrophobic block A. Thus, it may be desirable for a hydrophilic block B to contain, at least, any one of a linear polyethylene oxide or a multi-branched polyethylene oxide.

Furthermore, it may be thus desirable for an ABA-type amphipathic polymer to be an $A_nB$-type amphipathic polymer with 3 or more hydrophobic blocks A. This may be because hydrophobic association of hydrophobic segments A with one another as described below may readily occur so that a responsiveness of a viscosity to a change in a pH may be improved. Additionally, "ABA-type" in an ABA-type amphipathic polymer means a structure such that a hydrophilic block B and plural hydrophobic blocks A are bonded and a hydrophilic block B is a center thereof.

For another hydrophilic block B, there may be provided a vinyl alcohol polymer, a vinyl ether polymer, a vinylpyrrolidone polymer, an acrylamide polymer, a methacrylamide polymer, a derivative thereof, etc. Furthermore, an ionic one may be allowed, and there may be provided a polymer of a salt of acrylic acid, a polymer of a salt of methacrylic acid, a polymer of a quaternary ammonium salt of alkyl acrylate, a polymer of a quaternary ammonium salt of alkyl methacrylate, a polymer of a quaternary ammonium salt of alkyl acrylamide, a polymer of a salt of styrenesulfonic acid, etc. Furthermore, there may also be provided a cellulose derivative such as methyl cellulose, ethyl cellulose, hydroxyethyl cellulose, or carboxymethyl cellulose, a starch derivative such as methylstarch, ethylstarch, hydroxyethylstarch, or carboxymethylstarch, an alginic acid derivative such as propylene glycol alginate, an animal-derived polymer derivative such as gelatin, casein, albumin, or collagen, a plant-derived polymer derivative such as guar gum, locust bean gum, quince-seed gum, or carageenan, a microorganism-derived polymer derivative such as xanthan gum, dextran, hyaluronic acid, pullulan, or curdlan, etc.

Any stable chemical bond of a hydrophobic block A and a hydrophilic block B may be allowed, and there may be provided, for example, an ether linkage, a urethane linkage, an amide linkage, an ester linkage, etc.

It may be desirable for an anionic surfactant for dissolving or dispersing an ABA-type amphipathic polymer in an aqueous solvent to have a buffering function when being dissolved in an aqueous solvent. This may be because it may be possible to increase a viscosity of an aqueous solvent containing an ABA-type amphipathic polymer by an input of a small amount of proton when an anionic surfactant with a comparatively small degree of electrolytic dissociation is used. In other words, an amount of proton consumed by an electrolyte component or a color material component in an aqueous solvent may be small among inputted proton and it may be possible to increase an amount of proton consumed by efficiently conducting hydrophobic association of an ABA-type amphipathic polymer having an anionic surfactant adsorbed thereto. It may be more desirable for an anionic surfactant to receive a proton so that a hydrophilic group becomes hydrophobic and a function of surfactant may be lost. Herein, a buffering function refers to a function for keeping a value of pH of an aqueous solvent approximately constant even when a small amount of an acid or base is mixed thereto.

For such an anionic surfactant, a carboxylic acid-type surfactant which is a carboxylic acid-type anionic surfactant or a phosphoric acid ester-type surfactant which is a phosphoric acid ester-type anionic surfactant may be desirable.

More specifically, it may be preferable for a carboxylic acid-type surfactant to include any one or more of a salt of aliphatic carboxylic acid which is a salt of aliphatic acid, a salt of polyoxyethylene alkyl ether carboxylic acid, a salt of N-acylsarcosine acid, a salt of N-acylglutamic acid, a salt of alpha-sulfo-aliphatic acid ester, or a salt of multi-chain- and multi-hydrophilic-group-type carboxylic acid. As such, there may be provided sodium caproate, potassium caproate, triethanolamine caproate, sodium caprylate, potassium caprylate, triethanolamine caprylate, sodium caprate, potassium caprate, triethanolamine caprate, sodium laurate, potassium laurate, triethanolamine laurate, sodium myristate, potassium myristate, triethanolamine myristate, sodium palmitate, potassium palmitate, triethanolamine palmitate, sodium stearate, potassium stearate, triethanolamine stearate, sodium polyoxyethylene lauryl ether acetate, potassium polyoxyethylene lauryl ether acetate, triethanolamine polyoxyethylene lauryl ether acetate, sodium polyoxyethylene tridecyl ether acetate, potassium polyoxyethylene tridecyl ether acetate, triethanolamine polyoxyethylene tridecyl ether acetate, sodium lauroyl sarcosinate, potassium lauroyl sarcosinate, triethanolamine lauroyl sarcosinate, sodium myristoyl sarcosinate, potassium myristoyl sarcosinate, triethanolamine myristoyl sarcosinate, sodium stearoyl sarcosinate, potassium stearoyl sarcosinate, triethanolamine stearoyl sarcosinate, sodium coconut oil fatty acid sarcosinate, potassium coconut oil fatty acid sarcosinate, triethanolamine coconut oil fatty acid sarcosinate, sodium lauroyl methyl alanine, potassium lauroyl methyl alanine, triethanolamine lauroyl methyl alanine, sodium myristoyl methyl alanine, potassium myristoyl methyl alanine, triethanolamine myristoyl methyl alanine, sodium coconut oil fatty acid methylalanine, potassium coconut oil fatty acid methylalanine, triethanolamine coconut oil fatty acid methylalanine, sodium lauroyl glutamate, potassium lauroyl glutamate, triethanolamine lauroyl glutamate, sodium myristoyl glutamate, potassium myristoyl glutamate, triethanolamine myristoyl glutamate, sodium stearoyl glutamate, potassium stearoyl glutamate, triethanolamine stearoyl glutamate, sodium coconut oil fatty acid acyl glutamate, potassium coconut oil fatty acid acyl glutamate, triethanolamine coconut oil fatty acid acyl glutamate, sodium salt of 1-methyl ester of 2-sufotetradecanoic acid, potassium salt of 1-methyl ester of 2-sufotetradecanoic acid, sodium salt of 1-methyl ester of 2-sulfohexadecanoic acid, potassium salt of 1-methyl ester of 2-sulfohexadecanoic acid, dipotassium alkenylsuccinate, disodium alkenylsuccinate, sodium dilauramidoglutamide lysine, potassium dilauramidoglutamide lysine, etc.

Furthermore, for a phosphoric acid ester-type surfactant, a salt of alkylphosphoric acid may be preferable, and as such, there may be provided disodium laurylphosphate, sodium laurylphosphate, potassium laurylphosphate, ditrietanolamine laurylphosphate, trietanolamine laurylphosphate, disodium myristylphosphate, sodium myristylphosphate, potassium myristylphosphate, ditrietanolamine myristylphosphate, trietanolamine myristylphosphate, disodium palmitylphosphate, sodium palmitylphosphate, potassium palmitylphosphate, ditrietanolamine palmitylphosphate, trietanolamine palmitylphosphate, disodium stearylphosphate, sodium stearylphosphate, potassium stearylphosphate, ditrietanolamine stearylphosphate, trietanolamine stearylphosphate, etc.

As described below, an aqueous ink composition constituting a recording liquid may change a viscosity depending on its pH and a change in a pH of a recording liquid in an embodiment of the present invention may mean that a proton is supplied to an ink composition. There may be provided a pKa as a measure of pH for protonation of a carboxylate ion or phosphate ion which may provide a salt of weak acid. A pKa of a salt of fatty acid may be generally about 7-9, and is preferably higher. Furthermore, when there are plural pKa like a salt of phosphoric acid, it may be possible to attain a stepwise viscosity change.

A weight average molecular weight of an ABA-type amphipathic polymer is not particularly limited and it may be preferable for a molecular weight to be small when an ink-jet ejection characteristic on a condition that complete dissolution or dispersion is provided by a carboxylic acid-type surfactant, etc., is taken into consideration, whereas it may be preferable for a molecular weight of the polymer to be large when a hardness on a condition of thickening after a drop landing is taken into consideration. Accordingly, a range of 10,000 or greater and 100,000 or less may be preferable. Moreover, 20,000 or greater and 50,000 or less may be more preferable. For the number of repetition of polymer units, 100 monomers or more and 1000 monomers or less may be preferable. For a concentration of the polymer in an ink composition, a range of 0.1 weight % or greater and 10 weight % or less may be preferable, and 0.5 weight % or greater and 5 weight % or less may be more preferable.

A viscosity of a recording liquid at time of ejection may be 1-20 mPa·s and preferably 2-8 mPa·s. A recording liquid may produce a viscosity increase which may be at least 10 times, preferably 100 times, and more preferably 1000 or greater times that at time of ejection due to a viscosity increase caused by a change in a pH after a drop landing as described below, and may produce a gel state. In addition, for preferable ranges of physical properties of a recording liquid, a surface tension may be 10-60 mN/m and preferably 20-50 mN/m, and an electrical conductivity may be 0.01-1 S/m and preferably 0.02-0.2 S/m.

For a specific example of an anionic dye which is a coloring agent component or anionic color material to be contained in a recording liquid, there may be provided, for example, dyes classified into an acid dye, a direct dye, and a food color with respect to a color index.

More specifically, for an acid dye and a food color, there may be provided C.I. acid yellow 17, 23, 42, 44, 79, or 142, C.I. acid red 1, 8, 13, 14, 18, 26, 27, 35, 37, 42, 52, 82, 87, 89, 92, 97, 106, 111, 114, 115, 134, 186, 249, 254, or 289, C.I. acid blue 9, 29, 45, 92, or 249, C.I. acid black 1, 2, 7, 24, 26, or 94, C.I. food yellow 3 or 4, C.I. food red 7, 9, or 14, C.I. food black 1 or 2, etc.

For a direct dye, there may be provided C.I. direct yellow 1, 12, 24, 26, 33, 44, 50, 86, 120, 132, 142, or 144, C.I. direct red 1, 4, 9, 13, 17, 20, 28, 31, 39, 80, 81, 83, 89, 225, or 227, C.I. direct orange 26, 29, 62, or 102, C.I. direct blue 1, 2, 6, 15, 22, 25, 71, 76, 79, 86, 87, 90, 98, 163, 165, 199, or 202, C.I. direct black 19, 22, 32, 38, 51, 56, 71, 74, 75, 77, 154, 168, or 171, etc.

For a reactive dye, there may be provided C.I. reactive black 3, 4, 7, 11, 12, or 17, C.I. reactive yellow 1, 5, 11, 13, 14, 20, 21, 22, 25, 40, 47, 51, 55, 65, or 67, C.I. reactive red 1, 14, 17, 25, 26, 32, 37, 44, 46, 55, 60, 66, 74, 79, 96, or 97, C.I. reactive blue 1, 2, 7, 14, 15, 23, 32, 35, 38, 41, 63, 80, or 95, etc., and its use may be preferably made in view of a good solubility, a good color tone, or a good water-resistance in the case where recording is conduced by a method according to an embodiment of the present invention.

For a pigment which is coloring agent component or color material to be used for a recording liquid, there is provided an inorganic pigment or an organic pigment.

For an inorganic pigment, there may be provided a white pigment such as titanium oxide, zinc oxide, or barium sulfate or a black pigment such as iron oxide, etc.

For an organic pigment, it may be possible to use an azo pigment (including an azo lake, an insoluble azo pigment, a condensed azo pigment, a chelate azo pigment, etc.), a polycyclic pigment (for example, a phthalocyanine pigment, a perylene pigment, a perinone pigment, an anthraquinone pigment, a quinacridone pigment, a dioxazine pigment, a thioindigo pigment, an isoindolinone pigment, a quinofuraron pigment, etc.), a dye chelate (for example, a base dye-type chelate, an acid dye-type chetale, etc.), a nitro pigment, a nitroso pigment, an aniline black, etc.

Furthermore, a carbon black manufactured by a publicly known method such as a contact method, a furnace method or a thermal method may be used.

More specifically, for a color, there may be provided C.I. pigment yellow 1 (fast yellow G), 3, 12 (disazo yellow AAA), 13, 14, 17, 24, 34, 35, 37, 42 (yellow iron oxide), 53, 55, 81, 83 (disazo yellow HR), 95, 97, 98, 100, 101, 104, 408, 109, 110, 117, 120, 138, or 153, C.I. pigment orange 5, 13, 16, 17, 36, 43, or 51, C.I. pigment red 1, 2, 3, 5, 17, 22 (brilliant fast scarlet), 23, 31, 38, 48:2 (permanent red 2B (Ba)), 48:2 (permanent red 2B (Ca)), 48:3 (permanent red 2B (Sr)), 48:4 (permanent red 2B (Mn)), 49:1, 52:2, 53:1, 57:1 (brilliant carmine 6B), 60:1, 63:1, 63:2, 64:1, 81 (rhodamine 6G lake), 83, 88, 101 (red iron oxide), 104, 105, 106, 108 (cadmium red), 112, 114, 122 (quinacridone magenta), 123, 146, 149, 166, 168, 170, 172, 177, 178, 179, 185, 190, 193, 209, or 219, C.I. pigment violet 1 (rhodamine lake), 3, 5:1, 16, 19, 23, or 38, C.I. pigment blue 1, 2, 15 (phthalocyanine blur R), 15:1, 15:2, 15:3 (phthalocyanine blue E), 16, 17:1, 56, 60, or 63, C.I. pigment green 1, 4, 7, 8, 10, 17, 18, or 36, etc.

When a recording liquid containing a pigment as a coloring agent component is used, there may be preferably used, for example, a carbon black with a carboxyl group introduced by means of an oxidation reaction, a self-dispersive pigment provided by reacting a pigment such as carbon black, phthalocyanine, or quinacridone with a radical produced from a diazonium salt containing a carboxyl group or sulfonic acid group, a self-dispersive pigment provided by reacting a pigment such as carbon black, phthalocyanine, or quinacridone with a radical initiator containing a carboxyl group or sulfonic acid group, a self-dispersive pigment provided by reacting a carboxylic acid anhydride with a functional group of a pigment, etc.

When a recording liquid with a pigment dispersed therein is used, a size of a pigment particle is not particularly limited, and it may be preferable to use an ink with a pigment particle with a size of 20-150 nm at a maximum frequency in a reduced maximum number. If a size of a particle is greater than 150 nm, a stability of dispersion of a pigment in a recording liquid may be degraded and further a stability of ejection of a recording liquid may also be degraded, so that an image quality such as an image density may also be degraded, which may be unfavorable. Furthermore, if a size of a particle is less than 20 nm, a stability of storage of a recording liquid or its jetting characteristic in a printer may be stabilized to obtain a high image quality but an operation of dispersion or an operation of classification may be complicated in order to disperse a fine particle with such a size and it may be difficult to manufacture a recording liquid economically.

It may be preferable for a recording liquid to contain an anionic polymer-type dispersing agent such as a polymer dispersing agent or low-molecular-type one such as a surfactant, as a dispersing agent for dispersing a pigment.

As an example of a polymer-type dispersing agent having an anionic group, there may be provided, a polyacrylic acid or a salt thereof, a polymethacrylic acid or a salt thereof, an acrylic acid-acrylonitrile copolymer or a salt thereof, an acrylic acid-alkyl acrylate copolymer or a salt thereof, a styrene-acrylic acid copolymer or a salt thereof, a styrene-methacrylic acid copolymer or a salt thereof, a styrene-acrylic acid-alkyl acrylate copolymer or a salt thereof, a styrene-methacrylic acid-alkyl acrylate copolymer or a salt thereof, a styrene-α-methylstyrene-acrylic acid copolymer or a salt thereof, a styrene-α-methylstyrene-acrylic acid-alkyl acrylate copolymer or a salt thereof, a styrene-maleic acid copolymer or a salt thereof, a vinylnaphthalene-maleic acid copolymer or a salt thereof, a vinyl acetate-ethylene copolymer or a salt thereof, a vinyl acetate-crotonic acid copolymer or a salt thereof, a vinyl acetate-acrylic acid copolymer or a salt thereof, a condensate of β-naphthalenesulfonic acid and formalin, etc.

Such an anionic polymer may react with a hydrogen ion generated by means of electrolysis of water to aggregate, and hence, may be more preferable in its aggregation property than a single self-dispersion pigment. Furthermore, such an anionic polymer may have a function of adhesion of a coloring agent, and hence, may have an advantage of improving a transfer rate from the intermediate transfer body 37 to a transfer paper sheet S in a transfer process.

For a specific low-molecular-type dispersing agent having an anionic group, there may be provided a dispersing agent using oleic acid or a salt thereof, lauric acid or a salt thereof, behenic acid or a salt thereof, stearic acid or a salt thereof, or such a fatty acid or a salt thereof, dodecylsulfonic acid or a salt thereof, decylsulfonic acid or a salt thereof, or such an alkylsulfonic acid or a salt thereof, an ester of alkylsulfuric acid such as a salt of laurylsulfuric acid or a salt of oleylsulfuric acid, dodecybenzenesulfonic acid or a salt thereof, laurylbenzenesulfonic acid or a salt thereof, or such an alkylbenzenesulfonic acid or a salt thereof, dioctyl sulfosuccinate or a salt thereof, dihexyl sulfosuccinate or a salt thereof, or such a dialkyl sulfosuccinate or a salt thereof, naphthylsulfonic acid or a salt thereof, naphthylcarboxylic acid or a salt thereof, or such an aromatic anionic surfactant, a salt of polyoxyethylene alkyl ether acetic acid, a salt of polyoxyethylene alkyl ether phosphoric acid, a salt of polyoxyethylene alkyl ether sulfonic acid, or fluorine-containing anionic surfactant such as a fluorinated alkylcarboxylic acid or a salt thereof or a fluorinated alkylsulfonic acid or a salt thereof, etc.

Another example of a coloring agent component to be used in a recording liquid may be a recording liquid using a colored emulsion composed of a colored resin fine particle.

A colored resin fine particle may be provided by coloring a styrene-acryl resin, a polyester resin, a polyurethane resin, etc., with an oily dye, a dispersed dye or pigment, etc. A portion corresponding to a shell of a fine particle may be formed of a resin having a hydrophilic property such as a polyacrylic acid or a polymethacrylic acid or suspended with a surfactant having an ionic property such as a reactive surfactant, so that it may be possible to obtain a recording liquid in which, for example, an anionic colored fine particle may be suspended in a liquid medium based on water.

When a hydrophilic polymer compound is added into a recording liquid, it may be possible to enhance an action of viscosity increase or an action of aggregation of a recording liquid due to reaction with a hydrogen ion.

For a hydrophilic polymer compound capable of being added into a recording liquid, there may be provided, for natural one, a plant-derived polymer such as gum arabic, tragacanth gum, guar gum, karaya gum, locust bean gum, arabinogalactan, pectin, or quince-seed starch, a seaweed-derived polymer such as a salt of alginic acid, carageenan, or agar, an animal-derived polymer such as gelatin, casein, albumin, or collagen, a microorganism-derived polymer such as xanthan gum or dextran, or shellac, etc.; for semisynthetic one, a cellulose-type polymer such as methyl cellulose, ethyl cellulose, hydroxyethyl cellulose, hydroxypropyl cellulose, or carboxymethyl cellulose, a starch-type polymer such as sodium starch glycolate or sodium starch phosphate (ester), or a seaweed-derived polymer such as sodium alginate or propylene glycol alginate (ester); for pure-synthetic one, a vinylic polymer such as polyvinyl alcohol, polyvinyl pyrrolidone, or polyvinyl methyl ether, an acrylic resin such as a non-cross-linked polyacrylamide, polyacrylic acid or an alkali metal salt thereof, or a water-soluble styrene-acryl resin, or a water-soluble styrene-maleic acid resin, a water-soluble vinylnaphthalene-acryl resin, a water-soluble vinylnaphthalene-maleic acid resin, polyvinyl pyrrolidone, polyvinyl alcohol, an alkali metal salt of a condensate of β-naphthalenesulfonic acid and formalin, etc.

A resin emulsion containing no coloring agent or latex may be added into a recording liquid. A resin emulsion may form a coating on a surface of a transfer paper sheet S depending on a kind of a resin emulsion, and it may be possible to provide an advantage of improving even a light resistance, water resistance or abrasion resistance of a transfer paper sheet S when image formation is conducted. For a resin component in a suspension phase, there may be provided an acrylic resin, a vinyl acetate-type resin, a styrene-butadiene-type resin, a vinyl chloride-type resin, an acryl-styrene-type resin, a butadiene-type resin, a styrene-type resin, etc. Although a size of a particle of such a resin component is not limited as long as it may be possible to form an emulsion, 150 nm or less may be preferable and about 5-100 nm may be more preferable. For an example of commercially available resin emulsion, there may be provided Microgel E-1002 or E-5002 (a styrene-acryl-type resin emulsion, produced by Nippon Paint Co., Ltd.), Boncoat 4001 (an acrylic resin emulsion, produced by Dainippon Ink and Chemicals, Inc.), Boncoat 5454 (a styrene-acryl-type resin emulsion, produced by Dainippon Ink and Chemicals, Inc.), SAE-1014 (a styrene-acryl-type resin emulsion, produced by ZEON Corporation), Saibinol SK-200 (an acrylic resin emulsion, produced by Saiden Chemical Industry Co., Ltd.), etc.

It may be preferable to add a resin emulsion into a recording liquid in such a manner that there is 0.1-40 weight % of its resin component in a recording liquid, and a range of 1-10 weight % may be more preferable.

A polymer-type pigment dispersing agent, colored emulsion, or water-soluble polymer compound as described above, etc., in combination with an ABA-type amphipathic polymer, may be effective for improving a rate of transfer from the intermediate transfer body 37 to a transfer paper sheet S in a transfer process.

For a recording liquid, water may be used as a main liquid medium, and it may be preferable to use a water-soluble organic solvent described below as a humectant component in order to provide a recording liquid with a desired physical property or prevent a nozzle 61c described below from plugging as caused by drying of a recording liquid.

For a specific example of a water-soluble organic solvent, there may be provided a polyhydric alcohol such as ethylene glycol, diethylene glycol, triethylene glycol, tetraethylene glycol, propylene glycol, 1,3-propanediol, 2-methyl-1,3-propanediol, 1,4-butanediol, 1,5-pentanediol, 1,6-hexanediol, glycerin, 1,2,6-hexanetriol, 2-ethyl-1,3-hexanediol, 1,2,4-butanetriol, 1,2,3-butanetriol, or Petriol (3-methylpentane-1,3,5-triol), a polyhydric alcohol alkyl ether such as ethylene glycol monoethyl ether, ethylene glycol monobutyl ether, diethylene glycol monomethyl ether, diethylene glycol monoethyl ether, diethylene glycol monobutyl ether, triethylene glycol monobutyl ether, tetraethylene glycol monomethyl ether, or propylene glycol monoethyl ether, a polyhydric alcohol aryl ether such as ethylene glycol monophenyl ether or ethylene glycol monobenzyl ether, a nitrogen-containing heterocyclic compound such as N-methyl-2-pyrrolidone, N-hydroxyethyl-2-pyrrolidone, 2-pyrrolidone, 1,3-dimethylimidazolidinone, or ε-caprolactam, an amide such as formamide, N-methylformamide, or N,N-dimethylformamide, an amine such as monoethanolamine, diethanolamine, triethanolamine, monoethylamine, diethylamine, or triethylamine, a sulfur-containing compound such as dimethyl sulfoxide, sulfolane, or thiodiethanol, propylene carbonate, ethylene carbonate, or γ-butyrolactone, etc.

Furthermore, as another moisture retention component, it may also be possible to use a sugar alcohol such as sorbitol, a polysaccharide such as hyaluronic acid, a polymer such as polyethylene glycol, or a natural moisture retention component such as urea, lactic acid, a salt of citric acid, or an amino acid-type one. Such a solvent may be used singly, or plural ones may be mixed, together with water. A content of such a water-soluble organic solvent is not particularly limited, and preferably a range of 1-60 weight %, more preferably 10-40 weight %, of a whole ink may be used.

In order to electrolyze water in a recording liquid, it may be necessary to add an electrolyte component for increasing an ionic conductivity of a recording liquid. This may be because an electric current as described below, which may be used for increasing a viscosity of a recording liquid, may only flow in a recording liquid for a short time and hence it may be preferable to decrease a resistance of solution in order to improve a certainty of a viscosity increase wherein a resistance of a solution may be decreased by adding an electrolyte. However, a color material contained in a recording liquid may be dispersive, and hence, a dispersion property of a color material may be degraded by adding an electrolyte. Thus, for an electrolyte, a quaternary ammonium salt such as tetramethylammonium nitrate may be particularly preferable among the following electrolytes.

For an electrolyte component to be added to a recording liquid, there may be provided an inorganic alkali metal salt such as sodium chloride, potassium chloride, lithium chloride, rubidium chloride, sodium bromide, sodium iodide, sodium sulfate, sodium sulfite, sodium bisulfite, sodium thiosulfate, potassium sulfate, sodium nitrate, sodium nitrite, potassium nitrate, sodium phosphate, sodium carbonate, or sodium bicarbonate, an organic alkali metal salt such as sodium acetate, potassium acetate, sodium oxalate, sodium citrate, sodium hydrogen citrate, potassium citrate, or potassium hydrogen citrate, or an organic ammonium salt such as ammonium chloride, ammonium nitrate, ammonium sulfate, tetramethylammonium chloride, tetramethylammonium nitrate, or choline chloride, etc.

A multivalent metal salt with a valence of two or greater may degrade a dissolution or dispersion property of a coloring agent or ABA-type amphipathic polymer, etc. and hence, a monovalent metal salt may be preferable. In particular, it may be preferable to add a quaternary ammonium salt as an electrolyte component. A quaternary ammonium ion may have dispersion of an electric charge due to an alkyl group bonding to a central element, and accordingly, may cause a weak interaction with a coloring agent or an ABA-type amphipathic polymer, etc., so as to be stably present. Furthermore, a quaternary ammonium ion may not readily form a cluster with water, and also, may not frequently acquire hydration water which may be necessary for dissolving or dispersing a coloring agent or an ABA-type amphipathic polymer, etc. An electric conductivity per a unit molecular weight (molar ionic conductivity) of a compound with a small molecular weight may be high, and in particular, tetramethylammonium salt may be preferable in a quaternary ammonium salt. Furthermore, for a counter ion, there may be provided a chloride ion, a nitrate ion, a sulfate ion, etc., but a chloride ion may cause an electrode reaction on an anode to generate chlorine. Hence, an inactive nitrate ion or sulfate ion may be preferable.

For an acidic pH adjustor, it may be possible to use boric acid, carbonic acid, hydrochloric acid, nitric acid, sulfuric acid, acetic acid, ammonium chloride, etc. For a basic pH adjustor, it may be possible to use a hydroxide of alkali metal element such as lithium hydroxide, sodium hydroxide, or potassium hydroxide, a alkali metal carbonate (salt) such as ammonium hydroxide, a quaternary ammonium hydroxide, a quaternary phosphonium hydroxide, lithium carbonate, sodium carbonate, or potassium carbonate, or an amine such as diethanolamine or triethanolamine.

In addition, an additive such as a pH buffering agent, a viscosity modifier, an antiseptic agent, an antioxidant, or a rust inhibitor may be used according to need.

Thus adjusted recording liquid may have a characteristic of a viscosity change depending on a pH, specifically, a characteristic of a viscosity increase caused by an acid. That is, a recording liquid may include, at least, an aqueous solvent, a coloring agent dissolved or dispersed in such an aqueous solvent, an ABA-type amphipathic polymer composed of a hydrophobic segment A and a hydrophilic segment B, and a carboxylic acid-type surfactant for dissolving or dispersing such an ABA-type amphipathic polymer in the aqueous solvent, and hence, protonation of a carboxylate ion of a carboxylic acid-type surfactant which is a salt of weak acid may be promoted by lowering a pH of a recording liquid, but when such a function of surfactant is lost, an ABA-type polymer may not stably be dispersed in an ink composition so that plural hydrophobic segments A of an ABA-type polymer may cause hydrophobic association (physical cross-linking) of one another to form a network structure in a liquid whereby a viscosity of a recording liquid may increase. Thus, a recording liquid may be a pH-responsive ink composition which may exhibit a viscosity change in response to a pH change. A viscosity increase may be caused in combination with gelation.

As illustrated in FIGS. 2A, 2B, and 2C, each head 61Y, 61M, 61C, or 61BK includes a nozzle plate 61d provided with an electrically conductive orifice 61a which is an electrically conductive member and an electrically insulating orifice 61b which is an electrically insulating member, and a micronozzle 61c formed by communicating holes formed for the electrically conductive orifice 61a and electrically insulating orifice 61b with each other, at a recording liquid ejection side facing downwardly in the same figures.

Each head 61Y, 61M, 61C, or 61BK also includes a piezo-type movable actuator for applying a pressure onto a recording liquid in a liquid chamber by displacement of a piezo-element to eject the recording liquid from the nozzle 61c, as an actuator driven based on an image signal, for preparing and ejecting from the nozzle 61c a liquid drop of a recording liquid to be landed on a transfer paper sheet S, which is not illustrated in the figures, and such an actuator may be another-type movable actuator.

In addition, for each head 61Y, 61M, 61C, or 61BK, a heated film boiling type, such as thermal type, for applying a pressure on a recording liquid in a liquid chamber by a bubble generated by heating of a heater so as to eject a recording liquid from the nozzle 61c may be used.

Anyway, each head 61Y, 61M, 61C, or 61BK is driven in response to an image signal and a recording liquid is provided to a transfer paper sheet S via the intermediate transfer body 37 so that an image is formed. Many nozzles 61c are provided for each head 61Y, 61M, 61C, or 61BK, wherein only one thereof is illustrated in the figures. A diameter of the nozzle 61c is 25 μm.

The electrically conductive orifice 61a constitutes a surface of the head 61Y, 61M, 61C, or 61BK at a recording liquid ejection side. The electrically conductive orifice 61a is provided as a cathode as described below, and hence, it is not necessary to be composed of a material having a resistance to melting of a metal and it is sufficient to be composed of a material with a high electrical conductivity such as a metal or carbon.

The electrically insulating orifice 61b is provided to make insulation between a recording liquid contained in the head 61Y, 61M, 61C, or 61BK and the electrically conductive orifice 61a and be intervened therebetween. A material of the electrically insulating orifice 61b is not particularly limited as long as an electrical insulating property is provided.

Although the electrically conductive orifice 61a and the electrically insulating orifice 61b are joined to provide a double structure in an embodiment of the present invention, these may not necessarily be joined and another layer may be interposed between the electrically insulating orifice 61b and a recording liquid.

As illustrated in FIGS. 2A, 2B and 2C, the electrical conduction means 33 includes a power supply 33a, an electrical circuit for connecting the power supply 33a to the supporter 37a and the electrically conductive orifice 61a which is not particularly illustrated in the figures, and voltage application controlling means which are embodied as a part of a function of the control part 98 and control application timing or an application time of voltage of the power supply 33a. The power supply 33a is provided in such a manner that an anode is connected to the supporter 37a and a cathode is connected to the electrically conductive orifice 61a, by the electrical circuit. Hence, the electrical conduction means 33 include the supporter 37a and intermediate transfer body 37 as an anode and include the electrically conductive orifice 61a as a cathode. As described below, the electrical conductive means 33 function as voltage application means for applying a voltage for electrolyzing a recording liquid between the supporter 37a and the head 61Y, 61M, 61C, or 61BK.

In the image forming apparatus 100 with such a configuration, the intermediate transfer body 37 rotates in a direction A1 due to an input of predetermined signal for starting image formation while opposing each head 61Y, 61M, 61C, or 61BK, and in such a process, yellow, magenta, cyan, and black recording liquids are ejected from the heads 61Y, 61M, 61C, and 61BK, respectively, to be sequentially superposed at different timings from an upstream side to a downstream side in the direction A1, in such a manner that each of yellow, magenta, cyan, and black color image areas is superposed at the same position on the intermediate transfer body 37, so that an image is temporarily carried on the intermediate transfer body 37.

Herein, the electrical conduction means 33 are driven by the control part 98 as voltage application controlling means so that a voltage from the power supply 33a is applied between the supporter 37a and the electrically conductive orifice 61a.

In such a situation, a recording liquid is provided from each head 61Y, 61M, 61C, or 61BK to the intermediate transfer body 37. Herein, first, a recording liquid which forms a meniscus on a nozzle 61b as illustrated in FIG. 2A moves from the head 61Y, 61M, 61C, or 61BK to the intermediate transfer body 37 so that a tip of the recording liquid lands on the intermediate transfer body 37 and a bridge of a liquid column composed of the recording liquid is temporarily formed between the nozzle 61c and the intermediate transfer body 37 as illustrated in FIG. 2B, and then, the bridge of a liquid column composed of the recording liquid is separated to be carried on the intermediate transfer body 37 and form an image of the recording liquid on the intermediate transfer body 37, as illustrated in FIG. 2C. A diameter of a liquid column forming a bridge is about 10 μm and a diameter of a dot of a recording liquid carried on the intermediate transfer body 37 after separation of a bridge is about 50 μm.

Then, a color material component in a recording liquid is subjected to an action of aggregation by the electrical conduction means 33 in a condition that a bridge of a liquid column composed of a recording liquid is formed as illustrated in FIG. 2B. Specifically, due to a voltage applied by the electrical conduction means 33, the following electrode reactions:

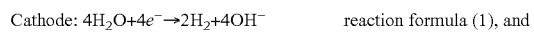

Cathode: $4H_2O + 4e^- \rightarrow 2H_2 + 4OH^-$      reaction formula (1), and

Anode: $2H_2O \rightarrow 4H^+ + O_2 + 4e^-$      reaction formula (2), are caused on the electrically conductive orifice 61a which is a cathode and the intermediate transfer body 37 which is an anode, respectively, so that water contained in a bridge of a liquid column of a recording liquid is electrolyzed.

Figure 3:
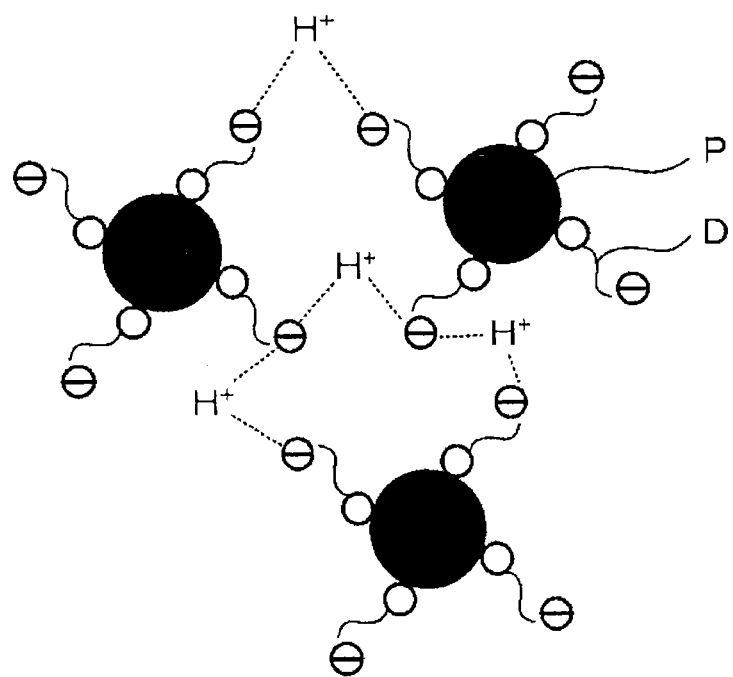
FIG. 3 is a conceptual diagram illustrating a condition that a coloring agent in a recording liquid ejected from a head in the image forming apparatus illustrated in FIG. 1 aggregates via a proton.

Thereby, water contained in a bridge of a liquid column of a recording liquid is oxidized to produce a proton ($H^+$) on a surface of the intermediate transfer body 37, which functions as an anode, and hence, a pigment P dispersed by an anionic dispersing agent D aggregates via a proton as illustrated in FIG. 3. Thereby, generation of spreading among adjacent dots may be suppressed to form a high-definition image. Furthermore, an advantage of preventing the nozzle 61c from clogging may also be provided by application of such a voltage. Additionally, it may be possible to control a period of time for forming such a bridge by a peak voltage or pulse width of an electromagnetic pulse applied on a piezoelectric element, etc.

Figure 4:
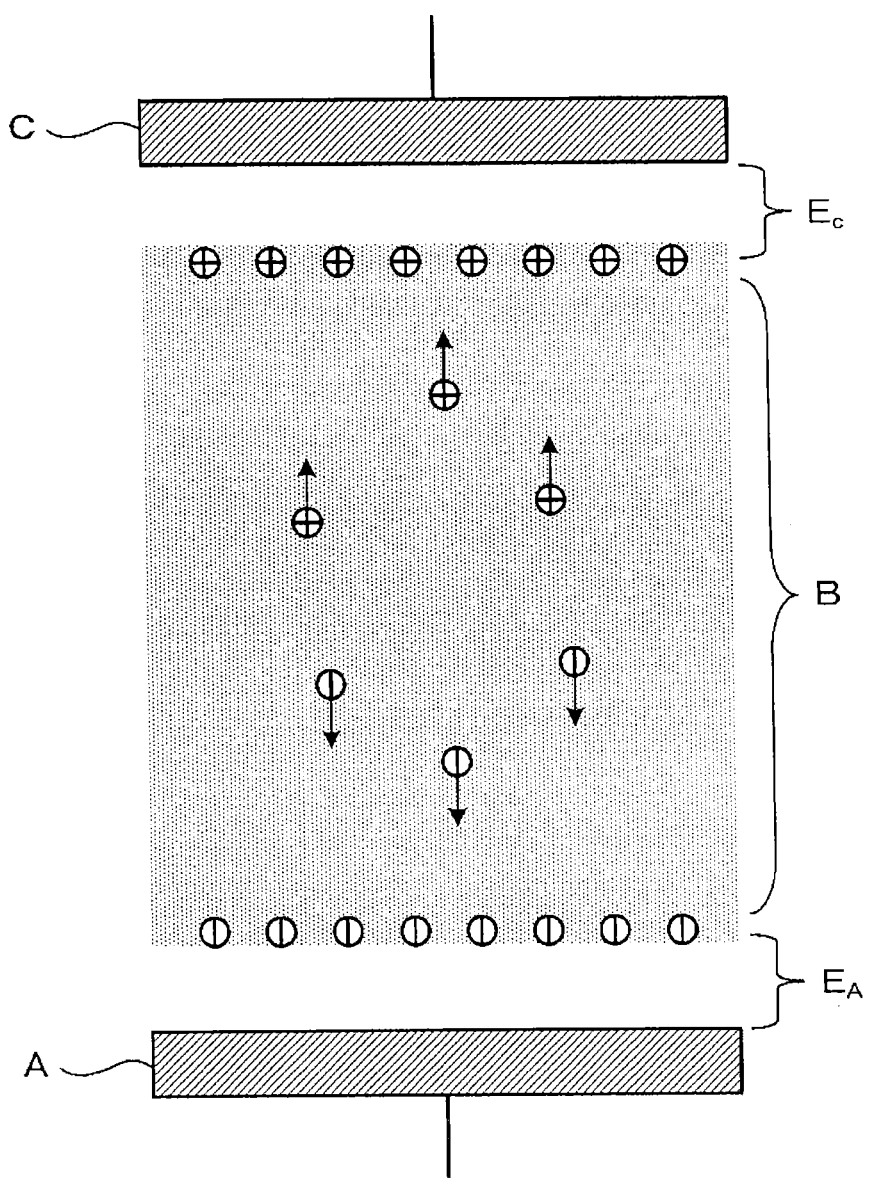
FIG. 4 is a conceptual diagram illustrating a condition of a liquid column of recording liquid formed between a cathode and an anode in the image forming apparatus illustrated in FIG. 1.

Herein, a bridge of liquid column which is formed between a cathode and an anode will be described by using FIG. 4. Inside a bridge of liquid column B, a cation and an anion may move to the vicinities of a cathode C and an anode A, respectively. As a result, electric double layers $E_C$ and $E_A$ may be formed on surfaces of the cathode C and the anode A, respectively, wherein a rate of charging the electric double layers $E_C$ and $E_A$ may generally be determined by an electrical conductivity of the bridge of liquid column B and a concentration of an ion contained in a recording liquid. Herein, when a voltage on the electric double layer $E_A$ reaches several V, water may be electrolyzed to produce a faradaic current. As a result, water may be oxidized to produce a proton on a surface of the anode A and a pigment dispersed by an anionic dispersing agent aggregates. On the other hand, a capacity of the electric double layer $E_C$ may be sufficiently greater than a capacity of the electric double layer $E_A$, and accordingly, water may not readily be reduced on a surface of the cathode C. This may be because a surface area of the electrically conductive orifice 61a which is the cathode C may be sufficiently greater than a surface area of the intermediate transfer body 37 as the anode A. Additionally, it may be possible to control a degree of aggregation of a pigment by an amount of a produced proton, that is, a period of time for forming a bridge of liquid column, a voltage applied by the electrical conduction means 33, etc. Furthermore, although oxygen may also be generated when water is oxidized to produce a proton, it is considered that a trace amount thereof may be provided and further dissolution in water may be caused, and hence, image formation may not be inhibited.

Thus, a non-faradaic current corresponding to formation of an electric double layer on an interface of an electrode and a faradaic current originating from electrolysis of water may be generated. In order to form an image of a recording liquid on the intermediate transfer body 37, while it may be insufficient for a voltage applied by the electrical conduction means 33 to be 1.23 V which is a theoretical decomposition voltage of water or a several-several dozen V which is a general condition on electrolysis of water, several dozen-several hundred V are preferable, wherein, at several dozen-several hundred V, a reaction resistance of electrolysis of water is small so as to be generally ignored and a solution resistance of a recording liquid is dominant. It takes several-several dozen s from formation of a bridge of liquid column B to separation of a liquid column in the vicinity of the nozzle 61c to end a bridging state, and an amount of electrically conductive charge is a product of such a period of time and a faradaic current, wherein when such a value is large, an amount of a generated hydrogen ion and an amount of a generated hydroxide ion increase.

Figure 5:
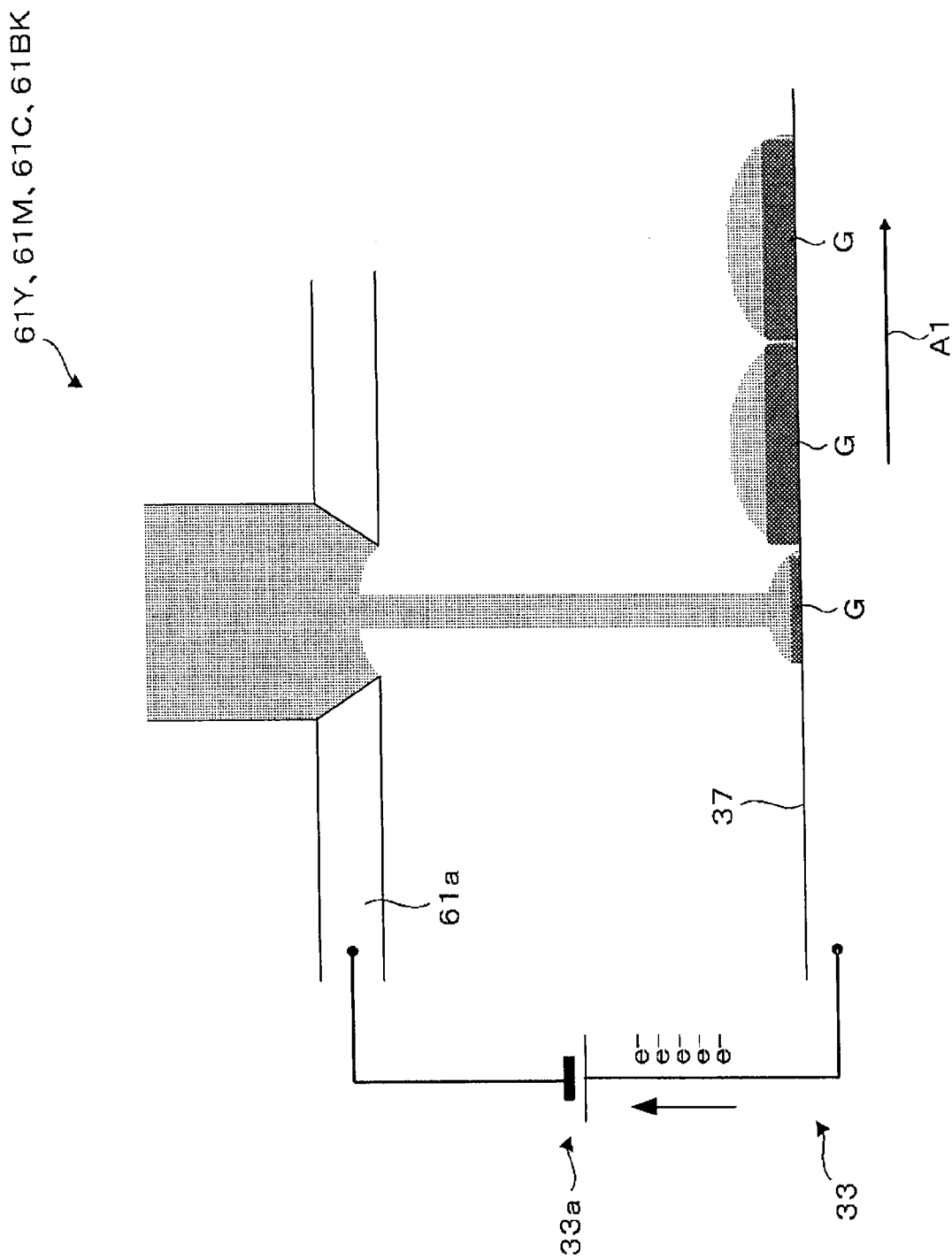
FIG. 5 is a conceptual diagram for illustrating that a change in the viscosity of a recording liquid in the image forming apparatus illustrated in FIG. 1 occurs depending on the pH thereof.

A recording liquid has a characteristic such that its viscosity is increased by an acid, and hence, an increased viscosity portion G is produced in a recording liquid having formed a bridge B as indicated in a deep color in FIG. 5. A hydrogen ion is generated from an interface of an electrode of the intermediate transfer body 37, and hence, an increased viscosity portion G may frequently be present at a portion of a recording liquid contacting a surface of the intermediate transfer body 37 and a vicinity thereof. Due to presence of an increased viscosity portion G, a problem of beading in which a dot is large or a position thereof is displaced due to a surface tension of the intermediate transfer body 37 may be suppressed.

The electrical conduction means 33 conducts a pH process for changing a viscosity, specifically increasing a viscosity, of a recording liquid, by applying a voltage between the intermediate transfer body 37 and the electrically conductive orifice 61a on a condition that a bridge B is formed, so that water contained in the recording liquid is electrolyzed. Such electrical conduction means 33 and the control part 98 as voltage application controlling means for driving the same function as pH control means for conducting such a pH process.

It may be essential to form a bridge B in order to conduct such electrolysis. Accordingly, each head 61Y, 61M, 61C, or 61BK is arranged and located to oppose the intermediate transfer body 37 at a distance at which it may be possible to form such a bridge B together with the intermediate transfer body 37 when a recording liquid is provided to the intermediate transfer body 37. Specifically, a gap or distance between a surface of the electrically conductive orifice 61a and a surface of the intermediate transfer body 37 is set between 50-300 μm, preferably 100-200 μm, and at 100 μm in an embodiment of the present invention. If greater than 200 μm is provided, a liquid column, depending on a kind of a recording liquid or a method of its ejection, is separated in the vicinity of the nozzle 61c before providing a bridge due to a surface tension of a recording liquid, so as to cause normal liquid drop formation, whereby it may be impossible to conduct electrolysis of water in a bridge of a recording liquid between the electrically conductive orifice 61a and the intermediate transfer body 37. Furthermore, if such a gap is small, it may be possible to obtain an advantage of improving a precision of drop landing of a recording liquid and providing a good compatibility with a kind of paper, etc., due to using of the intermediate transfer body 37, but if less than 50 μm is provided, it may be difficult to retain such a gap.

An image is formed on a transfer paper sheet S in a transfer process in which one transfer paper sheet S fed and sent from the paper feeding unit 20 is fed to the transfer part 31 in accordance with the timing at which a tip of an image carried on the intermediate transfer body 37 reaches the transfer part 31 and the transfer roller 38 dependently rotates and provide a pressure to a transfer paper sheet S passing through the transfer part 31 to contact the intermediate transfer body 37 tightly whereby an image carried on the intermediate transfer body 37 transfers onto a surface of the transfer paper sheet S. Thus, the transfer roller 38 is provided to transfer a recording liquid whose viscosity is changed by a pH process from the intermediate transfer body 37 to the transfer paper sheet S. The transfer paper sheet S on which an image is formed by a transfer process is guided to the paper ejection tray 25 and stacked on the paper ejection tray 25.

Thus, when an image transfers to a transfer paper sheet S, a mixture of a recording liquid with an increased viscosity and an aggregated component formed by reaction of a recording liquid, etc., transfers to a transfer paper sheet S. Hence, an image is formed by a color material aggregated due to an action of aggregation in a recording liquid with an increased viscosity, and even when a transfer paper sheet S is a plain paper sheet, it may be possible to prevent or suppress feathering or bleeding as well as beading and form an image with a high image density and a high image quality at a high speed.

Furthermore, it may be necessary to provide a quick-drying recording liquid in order to conduct a image formation at a high speed, and hence, a recording liquid generally has a high absorbency into a transfer paper sheet S, but, in such a case, a recording liquid is deeply permeated into a transfer paper sheet S to cause so-called offset and it may be unfavorable to from a double-side image. However, an absorbency of a recording liquid into a transfer paper sheet S is reduced due to such a viscosity increase and an action of aggregation, and hence, such an offset is prevented or suppressed to be also suitable for double-side image formation. Furthermore, a transfer process is also conducted by reducing an absorbency of a recording liquid into a transfer paper sheet S and confining a recording liquid with an increased viscosity in a hole among paper fibers, and hence, deformation of a transfer paper sheet S such as cocking or curling may be suppressed or prevented, whereby conveyance of a transfer paper sheet S with an image carried thereon may be improved and jamming may be prevented or suppressed, etc., to facilitate handling of a transfer paper sheet S.

In the image forming apparatus 100, a viscosity of a recording liquid increases, and hence, it is also considered that a recording liquid may be more difficult to permeate into an interior of a transfer paper sheet S and its quick-drying property may be degraded, compared to a case where there is no viscosity change. However, the transfer roller 38 transfers a recording liquid from the intermediate transfer body 37 to a transfer paper sheet S and simultaneously applies a pressure to the recording liquid and the transfer paper sheet S together with the intermediate transfer body 37, whereby a permeability of a recording liquid into an interior of a transfer paper sheet S may be improved. Herein, the transfer roller 38 and the intermediate transfer body 37 function as pressure application means for applying a pressure to a recording liquid and a transfer paper sheet S. Application of a pressure in a fixation process is conducted for improving a fixation property of a recording liquid with an increased viscosity, in particular, a color material in a recording liquid, on a transfer paper sheet S by pressing or shearing with the intermediate transfer body 37 and the transfer paper sheet S, as well as ensuring of a quick-dying property. The transfer roller 38 and the intermediate transfer body 37 also function as pressure application means, and hence, a structure of the image forming apparatus 100 may be simple thereby contributing to attainment of miniaturization and low cost.

It may be preferable for the transfer roller 38 to arrange or locate a water-repellent member with a low surface energy on a surface thereof, from the viewpoint of prevention of contamination caused by a recording liquid. Hence, the transfer roller 38 has, on a surface thereof, a surface layer of a fluororesin such as a tetrafluoroethylene resin or a tetrafluoroethylene/perfluoroalkoxyethylene copolymer, a rubber material such as a fluorosilicone rubber, a phenylsilicone rubber, a fluororubber, a chloroprene rubber, a nitrile rubber, a nitrile-butadiene rubber, or an isoprene rubber, or a resin, metal, or rubber with a fluorine-treated surface.

In regard to physical properties of the transfer roller 28 as a surface member, a receding contact angle of water is 60° or greater, and preferably 80° or greater, for a water-repellency, and a hardness on JIS-A is 60 or greater and preferably 80 or greater. Furthermore, a thickness of a surface layer is preferably about 0.1-1 mm and suitably 0.2-0.6 mm.

For a pressure at a time of pressurization, 1-100 kgf/cm$^2$ is preferable and 5-20 kgf/cm$^2$ is more preferable. It may be possible not only to assist a permeability of a recording liquid but also to improve a smoothness of a dot of a recording liquid by pressurizing a recording liquid on a transfer paper sheet S, whereby there may be an advantage of improving a gloss of an image. A permeability of a recording liquid into a transfer paper sheet S may be improved by such pressurization, and hence, a transfer of a recording liquid to a back surface of another transfer paper sheet S may be prevented or suppressed at time of stacking on the paper ejection tray 25.

Figure 6:
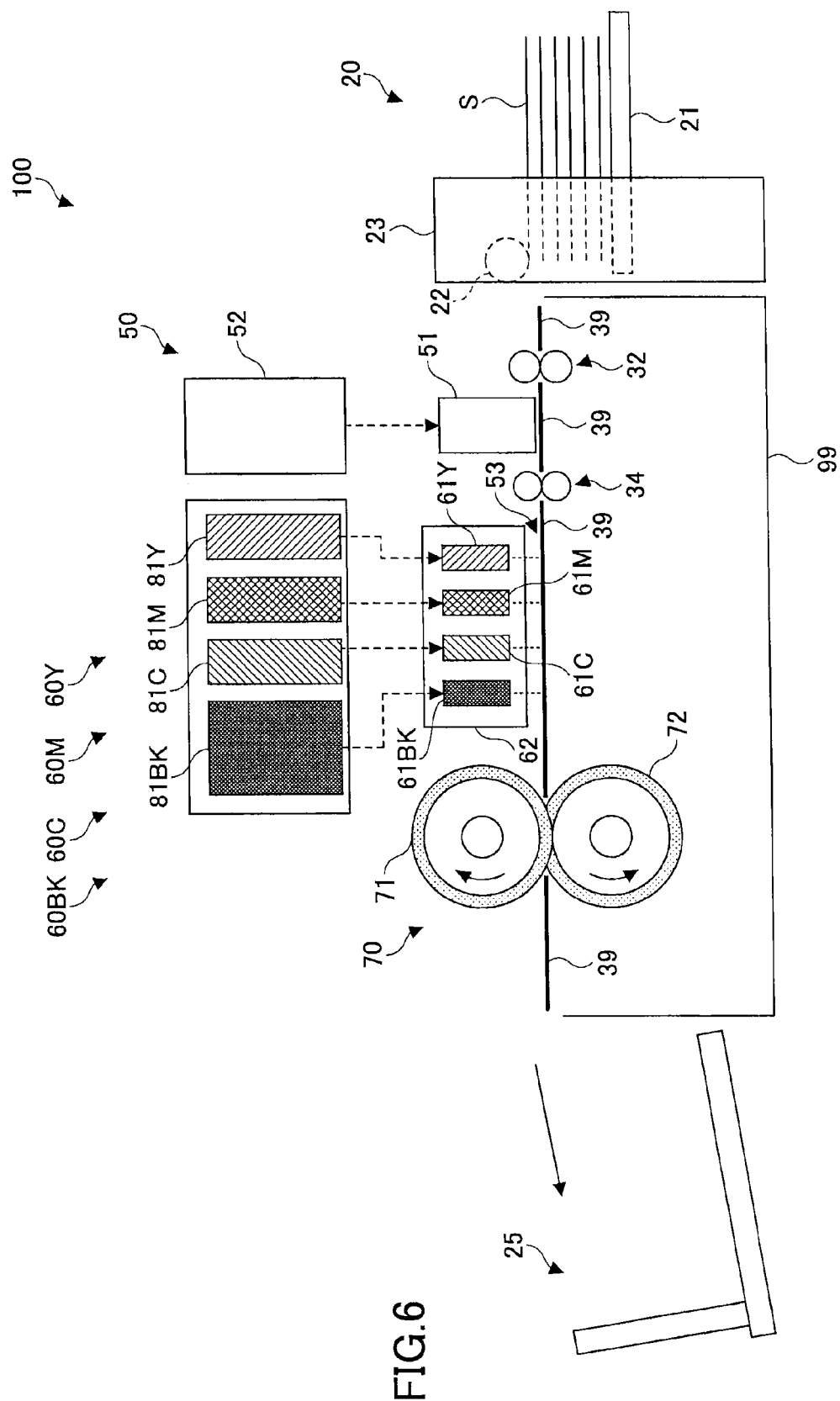
FIG. 6 is a schematic front view of another example of an image forming apparatus to which an embodiment of the present invention has been applied.

FIG. 6 illustrates another example of a configuration of the image forming apparatus 100. In such an image forming apparatus 100, the same reference numeral will be provided to a configuration similar to that included in the image forming apparatus 100 illustrated in FIG. 1 and its description will be omitted appropriately while the matters different from those of the image forming apparatus 100 illustrated in FIG. 1 will be described principally. Additionally, illustration of the control part 98 in the image forming apparatus illustrated in FIG. 6 is omitted.

The image forming apparatus 100 does not include the intermediate transfer body 37 or transfer roller 38 which is included in the image forming apparatus 100 illustrated in FIG. 1 but is a direct-mode image forming apparatus for directly conducting formation of an image on a transfer paper sheet S at a recording liquid ejection part 53 at which the head 61Y, 61M, 61C, or 61BK opposes the guide plate 39.

The image forming apparatus 100 illustrated in FIG. 6 does not include the electrical conduction means 33 and does not provide electrical conduction to a recording liquid. Accordingly, a pH process part 50 as pH control means is included for applying a pH process for changing a viscosity of a recording liquid provided onto a transfer paper sheet S to a transfer paper sheet S before being provided with a recording liquid. Hence, the image forming apparatus 100 illustrated in FIG. 6 is different from the image forming apparatus 100 illustrated in FIG. 1 for applying a pH process to a recording liquid before being provided onto a transfer paper sheet S simultaneously with providing of a recording liquid to the intermediate transfer body 37.

Additionally, the image forming apparatus 100 illustrated in FIG. 1 may have the pH process part 50 at a downstream side of the transfer unit 20 and an upstream side of the transfer part 31 in a direction of conveyance of a transfer paper sheet S or at a downstream side of the cleaning part 40 and an upstream side of the head 61Y, 61M, 61C, or 61BK in the direction A1. In such a case, it is also possible to omit the electrical conduction means 33 so as to omit application of a voltage to the head 61Y, 61M, 61C, or 61BK and the intermediate transfer body 33, and in the case where such a omission is made, no electrically conductive property of the electrically conductive orifice 61a or the intermediate transfer body 37 is required, wherein, for example, it may be possible to make the surface layer 37b of a silicone rubber simply. However, the image forming apparatus 100 illustrated in FIG. 1 does not include the pH process part 50, and accordingly, may be advantageous with respect to its cost and miniaturization compared to the case where the same is included.

The image forming apparatus 100 illustrated in FIG. 6 does not include the intermediate transfer body 37 or transfer roller 38 included in the image forming apparatus 100 illustrated in FIG. 1, and accordingly, includes a pressure application part 70 as pressure application means. Additionally, the image forming apparatus 100 illustrated in FIG. 1 may include the pressure application part 70 at a downstream side of the transfer part 31 and an upstream side of the paper ejection tray 25 in a direction of conveyance of a transfer paper sheet S.

The pH process part 50 conducts a chemical process for applying a pH adjustor to a surface of a transfer paper sheet S. An application method may be any of a roller application, a blade application, a wire bar application, a mist application by means of ink-jet, etc., etc., and a mist application by means of ink-jet may be employed in an embodiment of the present invention.

Hence, the pH process part 50 is arranged and located to oppose the guide plate 39 at an upstream side of the resistance roller 34 and a downstream side of the conveyance roller 32 in a direction of conveyance of a transfer paper sheet S and includes a head 51 as pH adjustor providing means for providing a pH adjustor to a transfer paper sheet S and a pH adjustor containing part 52 as pH adjustor supplying means for supplying a pH adjustor to the head 51.

It may be necessary for a pH adjustor to be acidic in order to lower a pH of a basic recording liquid, and its component may be, for example, an inorganic acid such as boric acid, carbonic acid, hydrochloric acid, nitric acid, sulfuric acid, or ammonium chloride, or an organic acid such as acetic acid, citric acid, or oxalic acid. When a pH adjustor is in an aqueous solution, a humectant as described for a recording liquid may be added thereto.

The pH adjustor containing part 52 contains a pH adjustor and supplies a contained pH adjustor to the head 51. The head 51 ejects a pH adjustor supplied from the pH adjustor containing part 52 to a transfer paper sheet S at the timing at which the transfer paper sheet S passes through between the head 51 and the guide plate 39.

The pressure application part 70 is arranged and located at a downstream side of the ejection part 53 and an upstream side of the paper ejection tray 25 in a direction of conveyance of a transfer paper sheet S. The pressure application part 70 has pressurization rollers 71 and 72 which presses and contacts each other and a motor which drives the pressurization roller 71 to rotate and rotate the pressurization roller 72 to be driven by the pressurization roller 71 and is not illustrated in the figure, and a transfer paper sheet S with a recording liquid provided at the ejection part 53 passes through between such pressurization rollers 71 and 72. Configurations of the pressurization rollers 71 and 72 are the same as the configuration of the transfer roller 38 and a pressure between the pressurization rollers 71 and 72 is the same as the pressure between the transfer roller 38 and the intermediate transfer body 37.

In the image forming apparatus with such a configuration, one transfer paper sheet S fed and sent from the paper feeding unit 20 is fed and sent to the ejection part 53 in response to an input of a predetermined signal for starting image formation. After such a transfer paper sheet S passes through the conveyance roller 32, a pH adjustor is applied by the pH process part 50 onto a surface at a side of provision of a recording liquid in the ejection part 53 so that such a surface is made acidic. Then, such a transfer paper sheet S is fed to the ejection part 53 while its timing is controlled by the resistance roller 34, and in a process of passing through the ejection part 53, yellow, magenta, cyan, and black recording liquids are ejected from the heads 61Y, 61M, 61C, and 61Bk, respectively, in such a manner that each of image areas of yellow, magenta, cyan, and black colors is superposed on the same position or sequentially superposed at different timings from an upstream side to a downstream side in a direction of its conveyance, whereby an image is formed.

When a recording liquid is provided on a transfer paper sheet S, reaction with a pH adjustor is made at time of its drop landing or permeation to cause a change in a pH and increase a viscosity so that an increased viscosity portion which is not illustrated in the figure is produced similarly to as illustrated in FIG. 5. An increased viscosity portion is frequently present at a portion of recording liquid which contacts a surface of a transfer paper sheet S and its vicinity. Due to presence of an increased viscosity part, a problem of beading in which a dot is large or its position is displaced may be suppressed.

Furthermore, an image is formed by a color material in a recording liquid with an increased viscosity, and hence, even when a transfer paper sheet S is a plain paper sheet, feathering or bleeding as well as beading may be prevented or suppressed and it may be possible to form an image with a high image density and a high image quality at a high speed.

Furthermore, it may be necessary to provide a quick-drying recording liquid in order to conduct image formation at a high speed, and hence, an absorbency of a recording liquid into a transfer paper sheet S may be generally high, but in such a case, a recording liquid may permeate into a transfer paper sheet S deeply to cause so-called offset and it may be unfavorable to form a double-side image. However, an absorbency of a recording liquid into a transfer paper sheet S may be reduced by such an increased viscosity of the recording liquid, and hence, such offset may be prevented or suppressed so that formation of a double-side image may also be suitable. Furthermore, an absorbency of a recording liquid into a transfer paper sheet S is reduced and further pressurization is conducted in such a manner that a recording liquid with an increased viscosity is confined in a hole among paper fibers, whereby deformation of a transfer paper sheet S such as cocking or curling may also be suppressed or prevented and accordingly conveyance of a transfer paper sheet S with a carried image may be improved to prevent or suppress jamming, etc., thereby facilitating handling of a transfer paper sheet S.

In the image forming apparatus 100, a viscosity of a recording liquid increases, and hence, a recording liquid may be difficult to permeate into an interior of a transfer paper sheet S and a quick-drying property may be degraded, compared to a case where there is no change in a viscosity. However, when a transfer paper sheet S with an image formed in the ejection part 53 passes through the pressure application part 70, a pressure as well as a recording liquid is applied to improve a permeability of the recording liquid into its interior. Furthermore, such application of a pressure may not only retain a quick-drying property but also improve a fixation property of a recording liquid, in particular, a color material in a recording liquid, on a transfer paper sheet S and it may be possible to improve smoothness of a dot of a recording liquid, whereby an advantage of improving a gloss of an image may be improved.

A transfer paper sheet S having passes through the pressure application part 70 is disguised to the paper ejection tray 25 and stacked on the paper ejection tray 25. A permeability of a recording liquid into a transfer paper sheet S may be improved by the pressure application part 70, and hence, transfer of a recording liquid to a back surface of another transfer paper sheet S may be prevented or suppressed at time of stacking on the paper ejection tray 25.

[Evaluation Test 1]

A performance of image formation of the image forming apparatus 100 with a configuration illustrated in each of FIG. 1 and FIG. 6 was confirmed by the following experiment on which the conditions as described above are taken into consideration.

<Conditions of Image Formation>

For practical examples 1-12 (corresponding to the image forming apparatus 100 illustrated in FIG. 6) and comparative examples 1 and 2

Each of recording liquids whose compositions and weight ratios were adjusted as described below was charged into each of heads of a commercially available ink-jet printer (GX-5000 produced by Ricoh Company, Ltd.) which were comparable to the heads 61Y, 61M, 61C, and 61BK, and an image was formed on a paper sheet (type 6200 produced by Ricoh Company, Ltd.) in which a pH on a paper surface was preliminarily adjusted as described below, so that evaluation of its image quality was conducted.

Practical Example 1

The pH of a paper surface was adjusted to 7 by an aqueous solution of aluminum sulfate.
Recording liquids were as follows.
<Black Recording Liquid>
A dispersion liquid of a sulfonic group bonding-type carbon black pigment (CAB-O-JET-200, solid content: 20 mass %, produced by Cabot Corporation): 35.0 mass %
2-pyrrolidone: 10.0 mass %
Glycerin: 14.0 mass %
Propylene glycol momobutyl ether: 0.9 mass %
Hydrophobic-modified polyetherurethane (corresponding to an ABA-type amphipathic polymer; produced by Adeka Corporation): 0.575 mass %
Potassium laurate (corresponding to an anionic surfactant and carboxylic acid-type surfactant): 0.38 mass %
Sodium dehydroacetate: 0.1 mass %
Distilled water: balance
Subsequently, adjustment to pH 9.1 was made by a 5 mass % aqueous solution of lithium hydroxide and filtration under pressure was conducted by a membrane filter with an average pore size of 0.8 μm.
<Yellow Recording Liquid>
A dispersion liquid of a sulfonic group bonding-type yellow pigment (CAB-O-JET-270Y, solid content: 10 mass %, produced by Cabot Corporation): 40.0 mass %
Triethylene glycol: 15.0 mass %
Glycerin: 25.0 mass %
Propylene glycol monobutyl ether: 0.9 mass %
Hydrophobic-modified polyetherurethane (corresponding to an ABA-type amphipathic polymer; produced by Adeka Corporation): 0.575 mass %
Potassium laurate (corresponding to an anionic surfactant and carboxylic acid-type surfactant): 0.38 mass %
Sodium dehydroacetate: 0.1 mass %
Distilled water: balance
Subsequently, adjustment to pH 9.1 was made by a 5 mass % aqueous solution of lithium hydroxide and filtration under pressure was conducted by a membrane filter with an average pore size of 0.8 p.m.
<Magenta Recording Liquid>
A dispersion liquid of a sulfonic group bonding-type magenta pigment (CAB-O-JET-260M, solid content: 10 mass %, produced by Cabot Corporation): 40.0 mass %
Diethylene glycol: 20.0 mass %
Propylene glycol monobutyl ether: 0.9 mass %
Hydrophobic-modified polyetherurethane (corresponding to an ABA-type amphipathic polymer; produced by Adeka Corporation): 0.575 mass %
Potassium laurate (corresponding to an anionic surfactant and carboxylic acid-type surfactant): 0.38 mass %
Sodium dehydroacetate: 0.1 mass %
Distilled water: balance
Subsequently, adjustment to pH 9.1 was made by a 5 mass % aqueous solution of lithium hydroxide and filtration under pressure was conducted by a membrane filter with an average pore size of 0.8 μm.
<Cyan Recording Liquid>
A dispersion liquid of a sulfonic group bonding-type cyan pigment (CAB-O-JET-250C, solid content: 10 mass %, produced by Cabot Corporation): 40.0 mass %
Ethylene glycol: 4.0 mass %
Triethylene glycol: 14.0 mass %
Propylene glycol monobutyl ether: 0.9 mass %
Hydrophobic-modified polyetherurethane (corresponding to an ABA-type amphipathic polymer; produced by Adeka Corporation): 0.575 mass %
Potassium laurate (corresponding to an anionic surfactant and carboxylic acid-type surfactant): 0.38 mass %
Sodium dehydroacetate: 0.1 mass %
Distilled water: balance
Subsequently, adjustment to pH 9.1 was made by a 5 mass % aqueous solution of lithium hydroxide and filtration under pressure was conducted by a membrane filter with an average pore size of 0.8 μm.

Practical Example 2

The pH of a paper surface was adjusted to 3 by an aqueous solution of citric acid.
Other conditions such as recording liquids were the same as Practical example 1.

Practical Example 3

The hydrophobic-modified polyetherurethane used for the recording liquids was changed to one synthesized as follows.
A sufficiently dried polyethylene glycol with a molecular weight of 35000 was added into chloroform so as to be 10 mass % and dissolved in a water bath at 60° C. Subsequently, octadecyl isocyanate with an amount equal to that of a hydroxyl group of the polyethylene glycol was added, and subsequently, a small amount of dibutyltim dilaurate as a catalyst was added to conduct reaction under an inert argon atmosphere. After 12 hours at 60° C., an excessive octadecyl isocyanate which was 3 timed a hydroxyl group of the polyethylene glycol was added and reaction was further conducted at 60° C. for 24 hours, whereby reaction of a hydroxyl group at a terminal of the polyethylene glycol and the isocyanate to provide an urethane linkage were completely conducted. This solution was added into excessive hexane to precipitate a polymer in hexane. A precipitate was filtered and vacuum-dried to obtain a white powder.
For this hydrophobic-modified polyetherurethane, there were differenced in such a manner that the molecular weight of a hydrophilic segment B was greater than that of the hydrophobic-modified polyetherurethane used in Practical examples 1 and 2 and a hydrophobic segment A of this hydrophobic-modified polyetherurethane contained a linear alkyl group whereas that of the hydrophobic-modified polyetherurethane used in Practical examples 1 and 2 contained a branched alkyl group.
Other conditions such as the pH of a paper surface were the same as Practical example 1.

Practical Example 4

The same recording liquids as Practical example 3 were used.
The pH of a paper surface was adjusted to 3 by an aqueous solution of citric acid similarly to Practical example 2.
Other conditions were the same as Practical example 1.

Practical Example 5

The pH of a paper surface was adjusted to 7 by an aqueous solution of aluminum sulfate.
Recording liquids were as follows.
<Black Recording Liquid>
A dispersion liquid of a sulfonic group bonding-type carbon black pigment (CAB-O-JET-200, solid content: 20 mass %, produced by Cabot Corporation): 35.0 mass %
2-pyrrolidone: 10.0 mass %
Glycerin: 14.0 mass %
Propylene glycol momobutyl ether: 0.9 mass %
Hydrophobic-modified polyetherurethane (corresponding to an ABA-type amphipathic polymer; produced by Adeka Corporation): 0.575 mass %
Potassium myristate (corresponding to an anionic surfactant and carboxylic acid-type surfactant): 0.38 mass %
Sodium dehydroacetate: 0.1 mass %
Distilled water: balance
Subsequently, adjustment to pH 9.1 was made by a 5 mass % aqueous solution of lithium hydroxide and filtration under pressure was conducted by a membrane filter with an average pore size of 0.8 μm.
<Yellow Recording Liquid>
A dispersion liquid of a sulfonic group bonding-type yellow pigment (CAB-O-JET-270Y, solid content: 10 mass %, produced by Cabot Corporation): 40.0 mass %
Triethylene glycol: 15.0 mass %
Glycerin: 25.0 mass %
Propylene glycol monobutyl ether: 0.9 mass %
Hydrophobic-modified polyetherurethane (corresponding to an ABA-type amphipathic polymer; produced by Adeka Corporation): 0.575 mass %
Potassium myristate (corresponding to an anionic surfactant and carboxylic acid-type surfactant): 0.38 mass %
Sodium dehydroacetate: 0.1 mass %
Distilled water: balance
Subsequently, adjustment to pH 9.1 was made by a 5 mass % aqueous solution of lithium hydroxide and filtration under pressure was conducted by a membrane filter with an average pore size of 0.8 μm.
<Magenta Recording Liquid>
A dispersion liquid of a sulfonic group bonding-type magenta pigment (CAB-O-JET-260M, solid content: 10 mass %, produced by Cabot Corporation): 40.0 mass %
Diethylene glycol: 20.0 mass %
Propylene glycol monobutyl ether: 0.9 mass %
Hydrophobic-modified polyetherurethane (corresponding to an ABA-type amphipathic polymer; produced by Adeka Corporation): 0.575 mass %
Potassium myristate (corresponding to an anionic surfactant and carboxylic acid-type surfactant): 0.38 mass %
Sodium dehydroacetate: 0.1 mass %
Distilled water: balance
Subsequently, adjustment to pH 9.1 was made by a 5 mass % aqueous solution of lithium hydroxide and filtration under pressure was conducted by a membrane filter with an average pore size of 0.8 μm.
<Cyan Recording Liquid>
A dispersion liquid of a sulfonic group bonding-type cyan pigment (CAB-O-JET-250C, solid content: 10 mass %, produced by Cabot Corporation): 40.0 mass %
Ethylene glycol: 4.0 mass %
Triethylene glycol: 14.0 mass %
Propylene glycol monobutyl ether: 0.9 mass %
Hydrophobic-modified polyetherurethane (corresponding to an ABA-type amphipathic polymer; produced by Adeka Corporation): 0.575 mass %
Potassium myristate (corresponding to an anionic surfactant and carboxylic acid-type surfactant): 0.38 mass %
Sodium dehydroacetate: 0.1 mass %
Distilled water: balance
Subsequently, adjustment to pH 9.1 was made by a 5 mass % aqueous solution of lithium hydroxide and filtration under pressure was conducted by a membrane filter with an average pore size of 0.8

Practical Example 6

The pH of a paper surface was adjusted to 3 by an aqueous solution of citric acid.
Other conditions such as recording liquids were the same as Practical example 5.

Practical Example 7

The hydrophobic-modified polyetherurethane used for the recording liquids were changed to those described in Practical example 3.
Other conditions such as the pH of a paper surface were the same as Practical example 5.

Practical Example 8

The same recording liquids as Practical example 7 were used.
The pH of a paper surface was adjusted to 3 by an aqueous solution of citric acid similarly to Practical example 6.
Other conditions were the same as Practical example 5.

Practical Example 9

The pH of a paper surface was adjusted to 7 by an aqueous solution of aluminum sulfate.
Recording liquids were as follows.
<Black Recording Liquid>
A dispersion liquid of a sulfonic group bonding-type carbon black pigment (CAB-O-JET-200, solid content: 20 mass %, produced by Cabot Corporation): 35.0 mass %
2-pyrrolidone: 10.0 mass %
Glycerin: 14.0 mass %
Propylene glycol momobutyl ether: 0.9 mass %
Hydrophobic-modified polyetherurethane (corresponding to an ABA-type amphipathic polymer; produced by Adeka Corporation): 0.575 mass %
Sodium dilauramidoglutamide lysine (corresponding to an anionic surfactant and carboxylic acid-type surfactant): 0.35 mass %
Sodium dehydroacetate: 0.1 mass %
Distilled water: balance
Subsequently, adjustment to pH 9.1 was made by a 5 mass % aqueous solution of lithium hydroxide and filtration under pressure was conducted by a membrane filter with an average pore size of 0.8 μm.
<Yellow Recording Liquid>
A dispersion liquid of a sulfonic group bonding-type yellow pigment (CAB-O-JET-270Y, solid content: 10 mass %, produced by Cabot Corporation): 40.0 mass %
Triethylene glycol: 15.0 mass %
Glycerin: 25.0 mass %
Propylene glycol monobutyl ether: 0.9 mass %

Hydrophobic-modified polyetherurethane (corresponding to an ABA-type amphipathic polymer; produced by Adeka Corporation): 0.575 mass %
Sodium dilauramidoglutamide lysine (corresponding to an anionic surfactant and carboxylic acid-type surfactant): 0.35 mass %
Sodium dehydroacetate: 0.1 mass %
Distilled water: balance Subsequently, adjustment to pH 9.1 was made by a 5 mass % aqueous solution of lithium hydroxide and filtration under pressure was conducted by a membrane filter with an average pore size of 0.8 μm.

<Magenta Recording Liquid>
A dispersion liquid of a sulfonic group bonding-type magenta pigment (CAB-O-JET-260M, solid content: 10 mass %, produced by Cabot Corporation): 40.0 mass %
Diethylene glycol: 20.0 mass %
Propylene glycol monobutyl ether: 0.9 mass %
Hydrophobic-modified polyetherurethane (corresponding to an ABA-type amphipathic polymer; produced by Adeka Corporation): 0.575 mass %
Sodium dilauramidoglutamide lysine (corresponding to an anionic surfactant and carboxylic acid-type surfactant): 0.35 mass %
Sodium dehydroacetate: 0.1 mass %
Distilled water: balance Subsequently, adjustment to pH 9.1 was made by a 5 mass % aqueous solution of lithium hydroxide and filtration under pressure was conducted by a membrane filter with an average pore size of 0.8 μm.

<Cyan Recording Liquid>
A dispersion liquid of a sulfonic group bonding-type cyan pigment (CAB-O-JET-250C, solid content: 10 mass %, produced by Cabot Corporation): 40.0 mass %
Ethylene glycol: 4.0 mass %
Triethylene glycol: 14.0 mass %
Propylene glycol monobutyl ether: 0.9 mass %
Hydrophobic-modified polyetherurethane (corresponding to an ABA-type amphipathic polymer; produced by Adeka Corporation): 0.575 mass %
Sodium dilauramidoglutamide lysine (corresponding to an anionic surfactant and carboxylic acid-type surfactant): 0.35 mass %
Sodium dehydroacetate: 0.1 mass %
Distilled water: balance Subsequently, adjustment to pH 9.1 was made by a 5 mass % aqueous solution of lithium hydroxide and filtration under pressure was conducted by a membrane filter with an average pore size of 0.8 μm.

Practical Example 10

The pH of a paper surface was adjusted to 3 by an aqueous solution of citric acid.
Other conditions such as recording liquids were the same as Practical example 9.

Practical Example 11

The hydrophobic-modified polyetherurethane used for the recording liquids was changed to that described in Practical example 3.
Other conditions such as the pH of a paper surface were the same as Practical example 9.

Practical Example 12

The same recording liquids as Practical example 11 were used.

The pH of a paper surface was adjusted to 3 by an aqueous solution of citric acid similarly to Practical example 10.
Other conditions were the same as Practical example 9.

Comparative Example 1

Recording liquids provided by removing the hydrophobic-modified polyetherurethane and potassium laurate from the recording liquids in Practical example 1 were used.
Other conditions such as the pH of a paper surface were the same as Practical example 1.

Comparative Example 2

The same recording liquids as Comparative example 1 were used.
The pH of a paper surface was adjusted to 3 by an aqueous solution of citric acid similarly to Practical example 2.
Other conditions were the same as Practical example 1.

[Results of Evaluation]
A solid image density, feathering, and bleeding which were items of evaluation are summarized in Table 1 for each of Practical examples 1-12 and Comparative examples 1 and 2. Criteria for evaluation were as follows.

For a solid image density, the case where a solid image density for a black color ink was 1.3 or greater, a case of 1.3-1.2, and less than 1.2, were referred to as A, B, and C, respectively.

For feathering, when spreading of a character of a black color ink was classified into some ranks, "very good", "good", "normal", and "bad" were referred to as A, B, C, and D, respectively.

For bleeding, when spreading of a character in a solid image of a yellow color ink was classified into some ranks, "very good", "good", "normal", and "bad" were referred to as A, B, C, and D, respectively.

TABLE 1

|  | Solid image density | Feathering | Bleeding |
| --- | --- | --- | --- |
| Practical example 1 | B | B | B |
| Practical example 2 | A | B | B |
| Practical example 3 | B | B | C |
| Practical example 4 | A | B | C |
| Practical example 5 | B | B | A |
| Practical example 6 | A | B | A |
| Practical example 7 | B | B | B |
| Practical example 8 | A | B | B |
| Practical example 9 | B | B | A |
| Practical example 10 | A | B | A |
| Practical example 11 | B | B | B |
| Practical example 12 | A | B | B |
| Comparative example 1 | C | D | D |
| Comparative example 2 | C | D | D |

From the same table, it may be possible to confirm an evidential effect that a solid image density was increased and spreading such as fathering or bleeding was mitigated by containing an ABA-type amphipathic polymer and a carboxylic acid-type surfactant in a recording liquid. For a solid image density, it was considered that it may be preferable for an acidity of a pH of a paper surface to be high. Furthermore, for bleeding, it was considered that it may be preferable for a hydrophobic segment A to contain a branched alkyl group and it may be preferable for an anionic surfactant to have a long chain or be a multi-chain and multi-hydrophilic-group-type.

[Evaluation Test 2] (Corresponding to the Image Forming Apparatus 100 Illustrated in FIG. 1)

<Image Formation Conditions>

The intermediate transfer body 37 was configured in such a manner that the supporter 37a was an aluminum untreated tube with a diameter of 20 mm and a length of 250 mm and an electrically conductive silicone rubber layer with a volume resistivity of 500 Ω·cm and a thickness of 0.2 mm as the surface layer 37b was formed around the periphery of the supporter 37a, and driven to rotate at 200 mm/s.

The transfer roller 38 was presses to the intermediate transfer body 37 at a load of 20 kgf/cm$^2$ and driven by the intermediate transfer body 37 to rotate.

The head 61Y, 61M, 61C, or 61BK was a line-type recording head used for GX-5000 produced by Ricoh Company, Ltd., in which the nozzle plate 61d is made of a metal, and was arranged in such a manner that a gap with the intermediate transfer body 37 was about 100 μm.

It was possible for the head 61Y, 61M, 61C, and 61BK to form any pattern of a dot(s) of recording liquid on a surface of the intermediate transfer body 37 by piezoelectric element driving means composed of the control part 98.

A plain paper sheet (type 6200) as a transfer paper sheet S passed between the intermediate transfer body 37 and the transfer roller 38 so that a dot(s) of recording liquid formed on the intermediate transfer body 37 transferred to a surface of a transfer paper sheet S.

The recording liquid was ejected by the piezoelectric element driving means composed of the control part 98 so as to provide 10 pL per 1 dot, and halftone dots of black ink were formed at 300 dpi in both a main scanning direction and a sub-scanning direction on a continuous band-like area with a width of about 1 inch in the sub-scanning direction which is the direction A1. Additionally, an electric current flowing at time of ejection of a recording liquid was also measured.

A black ink was used which was provided by replacing 8.3 mass % of the distilled water in each of the black inks used in Practical example 1, Practical example 3, Practical example 5, Practical example 7, Practical example 9, Practical example 11, and Comparative example 1 with 8.3 mass % of tetramethylammonium nitrate (corresponding to an electrolyte), and when driving of the intermediate transfer body 37 was stopped temporarily, the halftone dots of black ink on the intermediate transfer body 37 were observed by a digital microscope to evaluate a degree of beading.

<Results of Evaluation>

Whereas beading was caused on the intermediate transfer body 37 in the case where the ink used in Comparative example 1 was used, beading was suppressed in the case where the ink used in Practical example 1, Practical example 3, Practical example 5, Practical example 7, Practical example 9, or Practical example 11 was used.

[Evaluation Test 3]

Evaluation of buffering functions of various kinds of anionic surfactants and evaluation of a viscosity change in the case where a proton was introduced into a recording liquid containing such an anionic surfactant whose buffering function was evaluated will be described below.

<Buffering Function of Anionic Surfactant>

The results of evaluation of buffering functions of anionic surfactants are presented in Table 2. For a method of evaluation, each material was dissolved in distilled water to prepare an aqueous solution and presence or absence of a buffering function was evaluated based on the pH of each aqueous solution and the pH at which 2 ml of 0.1 N HCl was dropped into each aqueous solution. In Table 2, a pH value higher than or equal to 7 and a pH value less than 7 are described as "high" and "low", respectively. From Table 2, a result was provided such that sodium lauryl sulfate which was a sulfonic acid-type surfactant had no buffering function.

TABLE 2

| Anionic surfactant | pH | pH (after dropping 2 ml of 0.1N HCl) |
|---|---|---|
| 0.042 mol/L sodium decanoate solution | High | High |
| 0.042 mol/L potassium laurate solution | High | High |
| 0.042 mol/L potassium myristate solution | High | High |
| 0.042 mol/L sodium lauroyl methyl alanine | High | High |
| 0.042 mol/L sodium myristoyl methyl alanine | High | High |
| 0.042 mol/L sodium lysine dilauroyl glutamate solution | High | High |
| 0.021 mol/L sodium lauryl phosphate | High | High |
| 0.021 mol/L sodium lauryl sulfate | High | Low |

<Viscosity Changes in Recording Liquids>

Recording liquids containing anionic surfactants presented in Table 2 and prepared as described below were referred to as Practical examples 13-18 and Comparative examples 3 and 4, respectively, and when a proton was introduced into each of such recording liquids, a viscosity change thereof was evaluated. In order to perform a comparison between before and after introduction of a proton, a viscosity of each recording liquid before introduction of a proton was evaluated sensuously, and after 1 ml of 0.03 N HCl was added to 5 ml of each recording liquid or 1 ml of 0.06 N HCl was added thereto, a viscosity thereof was sensuously evaluated by the same method.

Practical Example 13

<Black Recording Liquid>
A dispersion liquid of a sulfonic group bonding-type carbon black pigment (CAB-O-JET-200, solid content: 20 mass %, produced by Cabot Corporation): 35.0 mass %
2-pyrrolidone: 10.0 mass %
Glycerin: 14.0 mass %
Propylene glycol momobutyl ether: 0.9 mass %

Hydrophobic-modified polyetherurethane (corresponding to an ABA-type amphipathic polymer; produced by Adeka Corporation): 0.575 mass %
Sodium decanoate (corresponding to an anionic surfactant): 0.36 mass %
Sodium dehydroacetate: 0.1 mass %
Distilled water: balance Practical Example 14

A recording liquid was as follows.
<Black Recording Liquid (the Same Composition as Practical Example 1)>
A dispersion liquid of a sulfonic group bonding-type carbon black pigment (CAB-O-JET-200, solid content: 20 mass %, produced by Cabot Corporation): 35.0 mass %
2-pyrrolidone: 10.0 mass %
Glycerin: 14.0 mass %
Propylene glycol momobutyl ether: 0.9 mass %
Hydrophobic-modified polyetherurethane (corresponding to an ABA-type amphipathic polymer; produced by Adeka Corporation): 0.575 mass %
Potassium laurate (corresponding to an anionic surfactant and carboxylic acid-type surfactant): 0.38 mass %
Sodium dehydroacetate: 0.1 mass %
Distilled water: balance Practical Example 15

A recording liquid was as follows.
<Black Recording Liquid (the Same Composition as Practical Example 5)>
A dispersion liquid of a sulfonic group bonding-type carbon black pigment (CAB-O-JET-200, solid content: 20 mass %, produced by Cabot Corporation): 35.0 mass %
2-pyrrolidone: 10.0 mass %
Glycerin: 14.0 mass %
Propylene glycol momobutyl ether: 0.9 mass %
Hydrophobic-modified polyetherurethane (corresponding to an ABA-type amphipathic polymer; produced by Adeka Corporation): 0.575 mass %
Potassium myristate (corresponding to an anionic surfactant and carboxylic acid-type surfactant): 0.38 mass %
Sodium dehydroacetate: 0.1 mass %
Distilled water: balance Practical Example 16

A recording liquid was as follows.
<Black Recording Liquid>
A dispersion liquid of a sulfonic group bonding-type carbon black pigment (CAB-O-JET-200, solid content: 20 mass %, produced by Cabot Corporation): 35.0 mass %
2-pyrrolidone: 10.0 mass %
Glycerin: 14.0 mass %
Propylene glycol momobutyl ether: 0.9 mass %
Hydrophobic-modified polyetherurethane (corresponding to an ABA-type amphipathic polymer; produced by Adeka Corporation): 0.575 mass %
Sodium lauroyl methylalanine (corresponding to an anionic surfactant and carboxylic acid-type surfactant): 0.27 mass %
Sodium dehydroacetate: 0.1 mass %
Distilled water: balance Practical Example 17

A recording liquid was as follows.
<Black Recording Liquid>
A dispersion liquid of a sulfonic group bonding-type carbon black pigment (CAB-O-JET-200, solid content: 20 mass %, produced by Cabot Corporation): 35.0 mass %
2-pyrrolidone: 10.0 mass %
Glycerin: 14.0 mass %
Propylene glycol momobutyl ether: 0.9 mass %
Hydrophobic-modified polyetherurethane (corresponding to an ABA-type amphipathic polymer; produced by Adeka Corporation): 0.575 mass %
Sodium myristoyl methylalanine (corresponding to an anionic surfactant and carboxylic acid-type surfactant): 0.44 mass %
Sodium dehydroacetate: 0.1 mass %
Distilled water: balance Practical Example 18

A recording liquid was as follows.
<Black Recording Liquid (the Same Composition as Practical Example 9)>
A dispersion liquid of a sulfonic group bonding-type carbon black pigment (CAB-O-JET-200, solid content: 20 mass %, produced by Cabot Corporation): 35.0 mass %
2-pyrrolidone: 10.0 mass %
Glycerin: 14.0 mass %
Propylene glycol momobutyl ether: 0.9 mass %
Hydrophobic-modified polyetherurethane (corresponding to an ABA-type amphipathic polymer; produced by Adeka Corporation): 0.575 mass %
Sodium dilauramidoglutamide lysine (corresponding to an anionic surfactant and carboxylic acid-type surfactant): 0.35 mass %
Sodium dehydroacetate: 0.1 mass %
Distilled water: balance Practical Example 19

A recording liquid was as follows.
<Black Recording Liquid>
A dispersion liquid of a sulfonic group bonding-type carbon black pigment (CAB-O-JET-200, solid content: 20 mass %, produced by Cabot Corporation): 35.0 mass %
2-pyrrolidone: 10.0 mass %
Glycerin: 14.0 mass %
Propylene glycol momobutyl ether: 0.9 mass %
Hydrophobic-modified polyetherurethane (corresponding to an ABA-type amphipathic polymer; produced by Adeka Corporation): 0.575 mass %
Sodium lauryl phosphate (corresponding to an anionic surfactant and phosphoric acid ester-type surfactant): 0.49 mass %
Sodium dehydroacetate: 0.1 mass %
Distilled water: balance Comparative Example 3

A recording liquid was as follows.
<Black Recording Liquid>
A dispersion liquid of a sulfonic group bonding-type carbon black pigment (CAB-O-JET-200, solid content: 20 mass %, produced by Cabot Corporation): 35.0 mass %

2-pyrrolidone: 10.0 mass %
Glycerin: 14.0 mass %
Propylene glycol momobutyl ether: 0.9 mass %
Hydrophobic-modified polyetherurethane (corresponding to an ABA-type amphipathic polymer; produced by Adeka Corporation): 0.575 mass %
Sodium lauryl sulfate (corresponding to an anionic surfactant): 0.46 mass %
Sodium dehydroacetate: 0.1 mass %
Distilled water: balance <Results of Evaluation>

Results of evaluation in a sensory evaluation of a viscosity, which was an item of evaluation, with respect to each of Practical examples 13-19 and Comparative example 3 are presented in Table 3. A sensory index for the sensory evaluation was "Extremely low", "Very low", "Low", "Moderate", "High", "Very high", or "Extremely high" in an order from a lower value of viscosity.

TABLE 3

| | Viscosity (before adding HCl) | Viscosity (after adding 1 ml of 0.03N HCl) | Viscosity (after adding 1 ml of 0.06N HCl) |
|---|---|---|---|
| Practical example 13 | Extremely low | Low | Low |
| Practical example 14 | Extremely low | High | High |
| Practical example 15 | Extremely low | Very high | Very high |
| Practical example 16 | Extremely low | Moderate | Moderate |
| Practical example 17 | Extremely low | High | High |
| Practical example 18 | Extremely low | Extremely high | Extremely high |
| Practical example 19 | Extremely low | Low | Moderate |
| Comparative example 3 | Extremely low | Extremely low | Extremely low |

The recording liquid containing the anionic surfactant illustrated in Comparative example 3 did not increase its viscosity even after a proton was introduced. On the other hand, the recording liquid illustrated in Practical example 19 slightly increased its viscosity in the case where only a small amount of a proton was introduced, but a moderate effect of a viscosity increase exhibited in the case where a large amount of a proton was introduced. Furthermore, the result was provided such that many of the recording liquids illustrated in Practical examples 13-18 greatly increased their viscosities. As the results of the recording liquids in Practical examples 13-18 were compared, it could be seen that an effect of an viscosity increase was high for an anionic surfactant with a long chain or a multi-chain and multi-hydrophilic-group-type surfactant. Furthermore, an extremely short chain as in the recording liquid in Practical example 13 provided a small effect of a viscosity increase and it was considered that this was caused by a lower function as a surfactant. For the recording liquids in Practical examples 14-18, when the length of a chain was identical or similar and a hydrophilic group such an amide linkage was contained in the chain, an effect of a viscosity increase tended to decrease. It was considered that a surfactant containing no hydrophilic group in its chain received a proton to be completely hydrophobic thereby exerting a large effect of a viscosity increase while a surfactant containing a hydrophilic group in its chain slightly had a function as a surfactant even after receiving a proton.

Although a preferable embodiment of the present invention has been described below, the present invention is not limited to such a particular embodiment, and various kinds of alterations or modifications are allowed in the spirit and scope of the present invention as recited in what is claimed unless a particular limitation is provided in the above description(s).

For example, adjustment of a pH may be conducted for an aqueous ink composition on a recording medium. However, as each embodiment described above, a configuration for adjusting a pH when a drop of an aqueous ink composition is landed may be more advantageous in view of beading at the time of drop landing.

An intermediate transfer body may not be a roller-type but may be an endless belt-type.

Furthermore, an image forming apparatus to which an embodiment of the present invention is applied is not limited to a type of the image forming apparatus as described above but may be another type of an image forming apparatus, that is, a single copying or facsimile machine, a combined machine thereof, a combined machine such as a monochromatic machine thereof, an image forming apparatus used for electrical circuit formation, an image forming apparatus for forming a predetermined image in the field of biotechnology, etc.

Although the effect described for an embodiment of the present invention may merely be listed as the most preferable effect produced by the present invention, the effect of am embodiment of the present is not limited to that described for an embodiment of the present invention.

APPENDIX

An Illustrative Embodiment(s) of at Least One of an Aqueous Ink Composition and an Image Forming Apparatus At least one illustrative embodiment of the present invention may relate to at least one of an aqueous ink composition to be used as a recording liquid for an ink-jet-type image forming apparatus for ejecting a recording liquid, such as an ink, from a head to conduct image formation, and such an image forming apparatus for using such an aqueous ink composition to conduct image formation.

An object of at least one illustrative embodiment of the present invention may be to provide at least one of an energy-saving ink composition which may be capable of obtaining an image with a less feathering, bleeding, or curling of a paper and a high image quality on a plain paper, may be capable of obtaining an image with a high image density, a good fixation property, and a high image quality on various materials to be recorded while a consumable item other than an ink, such as a reaction liquid or treatment liquid, may be used as little as possible, and may not need a large amount of a thermal energy for evaporating a water content of an ink on an intermediate transfer body, and an image forming apparatus using the same.

In order to achieve an object as described above, at least one illustrative embodiment of the present invention may be an aqueous ink composition whose viscosity may be changed depending on a pH thereof, which includes at least an aqueous solvent, a coloring agent dissolved or dispersed in such an aqueous solvent, an ABA-type amphipathic polymer composed of a hydrophobic segment A and a hydrophilic segment B, and an anionic surfactant for dissolving or dispersing such an ABA-type amphipathic polymer in the aqueous solvent.

According to at least one illustrative embodiment of the present invention, it may be possible to provide an aqueous ink composition capable of contributing to forming of a good image by being used for an image forming apparatus capable of controlling a pH of an aqueous ink composition, because there is provided an aqueous ink composition whose viscosity may be changed depending on a pH thereof, which includes at least an aqueous solvent, a coloring agent dissolved or dispersed in such an aqueous solvent, an ABA-type amphipathic polymer composed of a hydrophobic segment A and a hydrophilic segment B, and an anionic surfactant for dissolving or dispersing such an ABA-type amphipathic polymer in the aqueous solvent.

Illustrative embodiment (1) is an aqueous ink composition whose viscosity is changed depending on a pH thereof, which includes at least an aqueous solvent, a coloring agent dissolved or dispersed in such an aqueous solvent, an ABA-type amphipathic polymer composed of a hydrophobic segment A and a hydrophilic segment B, and an anionic surfactant for dissolving or dispersing such an ABA-type amphipathic polymer in the aqueous solvent.

Illustrative embodiment (2) is the aqueous ink composition as described in illustrative embodiment (1), wherein the aqueous ink composition is characterized in that the anionic surfactant has a buffering function when being dissolved in an aqueous solvent.

Illustrative embodiment (3) is the aqueous ink composition as described in illustrative embodiment (1) or illustrative embodiment (2), wherein the aqueous ink composition is characterized in that the ABA-type amphipathic polymer is an $A_nB$-type amphipathic polymer with 3 or more hydrophobic segments A described above.

Illustrative embodiment (4) is the aqueous ink composition as described in any one of illustrative embodiments (1) to (3), wherein the aqueous ink composition is characterized in that the hydrophobic segment A includes at least any one of a straight chain alkyl group, a branched alkyl group, a cyclic alkyl group, and a phenyl group.

Illustrative embodiment (5) is the aqueous ink composition as described in any one of illustrative embodiments (1) to (4), wherein the aqueous ink composition is characterized in that the hydrophilic segment B includes at least any one of a straight chain polyethylene oxide and a multi-branched polyethylene oxide.

Illustrative embodiment (6) is the aqueous ink composition as described in any one of illustrative embodiments (1) to (5), wherein the aqueous ink composition is characterized in that the anionic surfactant is a carboxylic-acid-type surfactant.

Illustrative embodiment (7) is the aqueous ink composition as described in illustrative embodiment (6), wherein the aqueous ink composition is characterized in that the carboxylic-acid-type surfactant includes at least any one of a salt of aliphatic carboxylic acid, a salt of polyoxyethylene alkyl ether carboxylic acid, a salt of N-acylsarcosine acid, a salt of N-acylglutamic acid, a salt of alpha-sulfo-aliphatic acid ester, and a salt of multi-chain- and multi-hydrophilic-group-type carboxylic acid.

Illustrative embodiment (8) is the aqueous ink composition as described in any one of illustrative embodiments (1) to (7), wherein the aqueous ink composition is characterized by including an electrolyte for improving an electrical conductivity of the ink composition.

Illustrative embodiment (9) is an image forming apparatus having image forming means for providing the aqueous ink composition as described in any one of illustrative embodiments (1) to (8) onto a body to be recorded on, depending on an image signal, to form an image.

Illustrative embodiment (10) is the image forming apparatus as described in illustrative embodiment (9), wherein the image forming apparatus is characterized by having pH control means for conducting a pH treatment for changing a viscosity of the aqueous ink composition provided on the body to be recorded on.

Illustrative embodiment (11) is the image forming apparatus as described in illustrative embodiment (9) or (10), wherein the image forming apparatus is characterized by having pressure application means for applying a pressure to a body to be recorded on, to which the aqueous ink composition has been provided, to improve a fixation property of the aqueous ink composition on a body to be recorded on.

Illustrative embodiment (12) is the image forming apparatus as described in illustrative embodiment (9), wherein the image forming apparatus is characterized by having an intermediate transfer body to which the aqueous ink composition is provided by the image forming means, pH control means for conducting a pH treatment for changing a viscosity of the aqueous ink composition which has been provided to such an intermediate transfer body by the image forming means, and transfer means for transferring the aqueous ink composition whose viscosity has been changed by the pH treatment from the intermediate transfer body to a body to be recorded on.

Illustrative embodiment (13) is the image forming apparatus as described in illustrative embodiment (12), wherein the image forming apparatus is characterized in that the image forming means are located to oppose the intermediate transfer body at distances capable of forming a bridge of the aqueous ink composition together with the intermediate transfer body when the aqueous ink composition is provided to the intermediate transfer body, and the pH control means has voltage application means for applying a voltage between the intermediate transfer body and the image forming means on a condition that the bridge has been formed, to electrolyze water included in the aqueous ink composition thereby conducting the pH treatment.

Although the illustrative embodiment(s) and specific example(s) of the present invention have been described with reference to the accompanying drawings, the present invention is not limited to any of the illustrative embodiment(s) and specific example(s) and the illustrative embodiment(s) and specific example(s) may be altered, modified, or combined without departing from the scope of the present invention.

The present application claims the benefit of its priority based on Japanese patent application No. 2011-180766 filed on Aug. 22, 2011 in Japan and Japanese patent application No. 2012-113608 filed on May 17, 2012 in Japan, the entire contents of which are hereby incorporated by reference herein.

What is claimed is:
1. An aqueous ink composition, comprising:
an aqueous solvent;
a coloring agent dissolved or dispersed in the aqueous solvent;
an ABA-type amphipathic polymer comprising a hydrophobic segment A and a hydrophilic segment B; and
an anionic surfactant configured to dissolve or disperse the ABA-type amphipathic polymer in the aqueous solvent,
wherein a viscosity of the aqueous ink composition is changed depending on a pH thereof, and
wherein the ABA-type amphipathic polymer is a hydrophobic-modified polyetherurethane.
2. The aqueous ink composition as claimed in claim 1, wherein the anionic surfactant dissolved in the aqueous solvent has a buffering function.

3. The aqueous ink composition as claimed in claim 1, wherein the ABA-type amphipathic polymer is an $A_nB$-type amphipathic polymer with 3 or more hydrophobic segments A.

4. The aqueous ink composition as claimed in claim 1, wherein the hydrophobic segment A comprises at least one selected from the group consisting of a straight chain alkyl group, a branched alkyl group, a cyclic alkyl group, and a phenyl group.

5. The aqueous ink composition as claimed in claim 1, wherein the hydrophilic segment B comprises at least one selected from the group consisting of a straight chain polyethylene oxide and a multi-branched polyethylene oxide.

6. The aqueous ink composition as claimed in claim 1, wherein the anionic surfactant is a carboxylic-acid-type surfactant.

7. The aqueous ink composition as claimed in claim 6, wherein the carboxylic-acid-type surfactant comprises at least one selected from the group consisting of a salt of aliphatic carboxylic acid, a salt of polyoxyethylene alkyl ether carboxylic acid, a salt of N-acylsarcosine acid, a salt of N-acylglutamic acid, a salt of alpha-sulfo-aliphatic acid ester, and a salt of multi-chain- and multi-hydrophilic-group-type carboxylic acid.

8. The aqueous ink composition as claimed in claim 1, further comprising an electrolyte configured to improve an electrical conductivity of the aqueous ink composition.

9. An image forming apparatus, comprising:
an image forming device configured to apply the aqueous ink composition as claimed in claim 1 onto a recording medium depending on an image signal to form an image.

10. The image forming apparatus as claimed in claim 9, further comprising a pH control device configured to conduct a pH treatment changing a viscosity of the aqueous ink composition applied on the recording medium.

11. The image forming apparatus as claimed in claim 9, further comprising a pressure application device configured to apply a pressure to the recording medium with the aqueous ink composition to improve a fixation property of the aqueous ink composition on the recording medium.

12. The image forming apparatus as claimed in claim 9, further comprising:
an intermediate transfer body, the aqueous ink composition being applied to the intermediate transfer body by the image forming device;
a pH control device configured to conduct a pH treatment changing a viscosity of the aqueous ink composition applied to the intermediate transfer body by the image forming device, and
a transfer device configured to transfer the aqueous ink composition with a viscosity changed by the pH treatment from the intermediate transfer body to the recording medium.

13. The image forming apparatus as claimed in claim 12, wherein the image forming device is located to oppose the intermediate transfer body at a distance capable of forming a bridge of the aqueous ink composition together with the intermediate transfer body when the aqueous ink composition is applied to the intermediate transfer body, and the pH control device comprises a voltage application device configured to apply a voltage between the intermediate transfer body and the image forming device on a condition that the bridge is formed, so that water contained in the aqueous ink composition is electrolyzed to conduct the pH treatment.

\* \* \* \* \*